(12) United States Patent
Su et al.

(10) Patent No.: US 12,309,850 B2
(45) Date of Patent: May 20, 2025

(54) SIGNAL AMPLIFICATION METHODS AND DEVICES IN SIGNAL PROCESSING

(71) Applicant: HUAWEI TECHNOLOGIES CO., LTD., Shenzhen (CN)

(72) Inventors: Yuwan Su, Shenzhen (CN); Yinghui Yu, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 17/591,068

(22) Filed: Feb. 2, 2022

(65) Prior Publication Data
US 2022/0159743 A1 May 19, 2022

Related U.S. Application Data

(63) Continuation of application No. PCT/CN2019/099323, filed on Aug. 5, 2019.

(51) Int. Cl.
*H04W 74/0833* (2024.01)
*H04W 72/0446* (2023.01)
*H04W 74/00* (2009.01)
*H04W 74/08* (2009.01)

(52) U.S. Cl.
CPC ... *H04W 74/0841* (2013.01); *H04W 72/0446* (2013.01); *H04W 74/006* (2013.01); *H04W 74/0866* (2013.01)

(58) Field of Classification Search
CPC .............. H04W 84/047; H04W 72/20; H04W 72/0446; H04W 72/04; H04W 72/00; H04W 72/0453; H04W 74/006; H04W 74/0841
See application file for complete search history.

(56) References Cited

U.S. PATENT DOCUMENTS

| 11,463,226 | B2 * | 10/2022 | Qin ................. | H04W 72/1263 |
| 2007/0015462 | A1 * | 1/2007 | Dean ................. | H04B 7/15557 |
| | | | | 455/15 |
| 2008/0151790 | A1 | 6/2008 | Lee et al. | |
| 2012/0076071 | A1 * | 3/2012 | Kim ................. | H04L 5/0053 |
| | | | | 370/315 |

(Continued)

FOREIGN PATENT DOCUMENTS

| CN | 101834654 A | 9/2010 |
| CN | 110087340 A | 8/2019 |

(Continued)

OTHER PUBLICATIONS

ATandT, Summary of 7.7.1 Enhancements to support NR backhaul links. 3GPP TSG RAN WG1 Meeting #92bis, Sanya, China, Apr. 16-20, 2018, R1-1805673, 13 pages.

*Primary Examiner* — Allahyar Kasraian
(74) *Attorney, Agent, or Firm* — Rimon PC

(57) ABSTRACT

A signal processing method, a device, and a system are provided, to reduce noise interference generated by a repeater. The method includes a first device that determines a first time domain resource position for transmitting a first signal and sends first control signaling to a second device at or before the start position of the first time domain resource position. The second device receives the first control signaling and enables a signal amplification function based on the received first control signaling.

12 Claims, 19 Drawing Sheets

(56) References Cited

U.S. PATENT DOCUMENTS

| | | | |
|---|---|---|---|
| 2013/0005378 A1* | 1/2013 | Hasegawa | H04W 16/06 |
| | | | 455/509 |
| 2013/0136110 A1* | 5/2013 | Yamamoto | H04W 72/541 |
| | | | 370/336 |
| 2014/0334375 A1 | 11/2014 | Sugitani | |
| 2015/0140926 A1* | 5/2015 | Fujio | H04B 7/15507 |
| | | | 455/7 |
| 2020/0112381 A1* | 4/2020 | Barnes | H04B 7/15535 |
| 2021/0037457 A1* | 2/2021 | Li | H04W 52/0203 |
| 2021/0185723 A1* | 6/2021 | Abedini | H04W 74/0833 |
| 2021/0345344 A1* | 11/2021 | Sha | H04W 72/1273 |

FOREIGN PATENT DOCUMENTS

| | | |
|---|---|---|
| EP | 2234289 A2 | 9/2010 |
| WO | 2009076995 A1 | 6/2009 |

* cited by examiner

SIGNAL AMPLIFICATION METHODS AND DEVICES IN SIGNAL PROCESSING

CROSS-REFERENCE TO RELATED APPLICATIONS

This application is a continuation of International Application No. PCT/CN2019/099323, filed on Aug. 5, 2019, the disclosure of which is hereby incorporated by reference in its entirety.

TECHNICAL FIELD

This application relates to the field of communication technologies, and in particular, to a signal processing method, a device, and a system.

BACKGROUND

With rapid development of wireless communication, people are no longer satisfied with only having human-to-human communication. An internet of things (IoT) technology has emerged, and a market demand of the IoT technology has increased rapidly. IoT devices are usually small and battery-powered systems, such as intelligent meter reading systems that may need to be periodically monitored and report use statuses of water, electricity, gas, and the like. These devices are usually deployed in places with poor radio signal coverage, such as basements or walls. Therefore, coverage enhancement is a basic design requirement for designing an IoT communication system, and a 20-dB coverage enhancement may be required in terms of an air interface single-hop.

The 20-dB coverage enhancement of the single-hop of IoT can meet coverage requirements in most scenarios. However, in some special scenarios, for example, in a multi-story building scenario, if a base station is located on the rooftop, an IoT terminal device on a floor closer to the base station can be properly served, but an IoT terminal device on a floor farther away from the base station may not be well served. In addition, in some other scenarios in which some gas meters are located deep underground, it may be impossible to receive the signals through one hop. In these scenarios, it is also difficult to deploy wired backhaul links. Therefore, a relay mechanism may be introduced to further solve the deep coverage problem of a terminal device.

Generally, relays are classified into three types: a layer 1 relay, a layer 2 relay, and a layer 3 relay. The layer 1 relay, also referred to as a repeater, a relay, or the like, is mainly configured to amplify and resend or forward an attenuated signal, so as to resolve the deep coverage problem of the terminal device. FIG. 1 is a schematic diagram of a network architecture of a common relay system. It can be learned from FIG. 1 that, a repeater is a relay node, and the repeater node is connected to a donor evolved NodeB (DeNB) through a Un interface and connected to a remote terminal device through a Uu interface.

However, the repeater may generate noise that interferes with the DeNB and another terminal device.

SUMMARY

Embodiments of this application provide a signal processing method, a device, and a system, to reduce noise interference generated by a repeater.

To achieve the foregoing objective, the following technical solutions are used in embodiments of this application.

According to a first aspect, a signal processing method is provided. The method includes a first device determines a first time domain resource position for transmitting a first signal, and the first device sends first control signaling to a second device at or before a start position of the first time domain resource position, where the first control signaling is used to enable a signal amplification function of the second device. Generally, as a repeater is generally enabled, the repeater amplifies both wanted signals and noise. When a DeNB does not send data to a remote terminal device, amplified noise causes noise interference to the DeNB and another terminal device. According to this solution, the first device can indicate, at or before the start position of the first time domain resource position for transmitting the first signal, the second device to enable the signal amplification function. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

In a possible design, that a first device determines a first time domain resource position for transmitting a first signal includes the first device receives a second signal from a network device, where the second signal includes information used to indicate the first time domain resource position, and the first device determines the first time domain resource position based on the second signal. In other words, in some embodiments of this application, the first device can determine the first time domain resource position based on the information that is included in the second signal and that is used to indicate the first time domain resource position.

In a possible design, that the first device determines the first time domain resource position based on the second signal includes the first device parses the second signal by using a first radio network temporary identifier, to obtain the first time domain resource position, where the first radio network temporary identifier is a radio network identifier used by a first remote terminal device to parse the second signal, and the first remote terminal device is a terminal device that receives the second signal. In other words, in some embodiments of this application, the first device can parse, by using the radio network temporary identifier used by the first remote terminal device to parse the second signal, the second signal received by the first device.

In a possible design, the second signal is a first downlink control message carried on a first physical downlink control channel, and the first signal is first downlink data carried on a first physical downlink shared channel, the second signal is a second downlink control message carried on a second physical downlink control channel, and the first signal is first uplink data carried on a first physical uplink shared channel; the second signal is a random access response (RAR), and the first signal is a message 3 in a random access process, or the second signal is second downlink data carried on a second physical downlink shared channel, and the first signal is a third downlink control message carried on a third physical downlink control channel.

In a possible design, the method further includes the first device determines a first common search space or a first terminal-specific search space corresponding to a second time domain resource position for transmitting the second signal, and the first device determines the first radio network temporary identifier based on the first common search space or the first terminal-specific search space and a prestored mapping relationship between the first radio network temporary identifier and the first common search space or the first terminal-specific search space. According to this solution, the first device can determine the first radio network temporary identifier.

In a possible design, the method further includes the first device parses a preamble carried on a physical random access channel to obtain the first radio network temporary identifier, or the first device parses third downlink data carried on a third physical downlink shared channel to obtain the first radio network temporary identifier. According to this solution, the first device can determine the first radio network temporary identifier.

In a possible design, the second signal is a master information block (MIB), and the first signal is a system information block (SIB) 1, the second signal is a SIB 1, and the first signal is a SIB other the SIB 1, the second signal is a first system information block, and the first signal is a preamble carried on a physical random access channel, or the second signal is a second system information block, and the first signal is a fourth downlink control message carried on a fourth physical downlink control channel.

In a possible design, the first time domain resource position is a specified time domain resource position.

In a possible design, the first signal includes a synchronization signal, a master information block (MIB), or an SIB 1.

In a possible design, the method further includes the first device sends second control signaling to the second device at or after an end position of the first time domain position, where the second control signaling is used to disable the signal amplification function. According to this solution, the signal amplification function can be disabled in time when no signal needs to be forwarded. This can avoid the problem that amplified noise causes noise interference to the DeNB and the other terminal device when the DeNB does not send data to the remote terminal device, and therefore reduce noise interference.

In a possible design, the first device is in a persistent connection mode after being powered on and accessing a network.

In a possible design, the method further includes the first device receives a radio resource control (RRC) message from the network device, where the RRC message is used to notify the first device that system information changes.

According to a second aspect, a signal processing method is provided. The method includes a second device receives a first control signaling from a first device at or before a start position of a first time domain resource position for transmitting a first signal, and the second device enables a signal amplification function of the second device according to the first control command, so that the second device amplifies the first signal at the first time domain resource position. Generally, as a repeater is generally enabled, the repeater amplifies both wanted signals and noise. When a DeNB does not send data to a remote terminal device, amplified noise causes noise interference to the DeNB and another terminal device. According to this solution, the first device can indicate, at or before the start position of the first time domain resource position for transmitting the first signal, the second device to enable the signal amplification function. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

In a possible design, the first time domain resource position is determined based on a second signal sent by a network device to a first remote terminal device, and the second signal includes information used to indicate the first time domain resource position. In other words, in some embodiments of this application, the first device can determine the first time domain resource position based on the information that is included in the second signal and that is used to indicate the first time domain resource position.

In a possible design, that the first time domain resource position is determined based on a second signal sent by a network device to a first remote terminal device includes: The first time domain resource position is obtained by the first device by parsing the second signal by using a first radio network temporary identifier, where the first radio network temporary identifier is a radio network identifier used by the first remote terminal device to parse the second signal. In other words, in some embodiments of this application, the first device can parse, by using the radio network temporary identifier used by the first remote terminal device to parse the second signal, the second signal received by the first device.

In a possible design, the second signal is a first downlink control message carried on a first physical downlink control channel, and the first signal is first downlink data carried on a first physical downlink shared channel; the second signal is a second downlink control message carried on a second physical downlink control channel, and the first signal is first uplink data carried on a first physical uplink shared channel, the second signal is a RAR, and the first signal is a message 3 in a random access process, or the second signal is second downlink data carried on a second physical downlink shared channel, and the first signal is a third downlink control message carried on a third physical downlink control channel.

In a possible design, the second signal is a master information block (MIB), and the first signal is a system information block (SIB) 1; or the second signal is a SIB 1, and the first signal is a SIB other the SIB 1; the second signal is a first system information block, and the first signal is a preamble carried on a physical random access channel, the second signal is a second system information block, and the first signal is a fourth downlink control message carried on a fourth physical downlink control channel.

In a possible design, the first time domain resource position is a specified time domain resource position.

In a possible design, the first signal includes a synchronization signal or a master information block (MIB).

In a possible design, the method further includes the second device receives a second control command from the first device at or after an end position of the first time domain resource position for transmitting the first signal, and the second device disables the signal amplification function of the second device according to the second control command. According to this solution, the signal amplification function can be disabled in time when no signal needs to be forwarded. This can avoid the problem that amplified noise causes noise interference to the DeNB and the other terminal device when the DeNB does not send data to the remote terminal device, and therefore reduce noise interference.

According to a third aspect, a signal processing method is provided. The method includes a third device determines a first time domain resource position for transmitting a first signal, and the third device enables a signal amplification function of the third device at or before a start position of the first time domain resource position. Generally, as a repeater is generally enabled, the repeater amplifies both wanted signals and noise. When a DeNB does not send data to a remote terminal device, amplified noise causes noise interference to the DeNB and another terminal device. According to this solution, the third device can determine the first time domain resource position for transmitting the first signal, and enable the signal amplification function of the third device at or before the start position of the first time domain resource position. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

In a possible design, that a third device determines a first time domain resource position for transmitting a first signal includes the third device receives a second signal from a network device, where the second signal includes information used to indicate the first time domain resource position, and the third device determines the first time domain resource position based on the second signal. In other words, in some embodiments of this application, the third device can determine the first time domain resource position based on the information that is included in the second signal and that is used to indicate the first time domain resource position.

In a possible design, that the third device determines the first time domain resource position based on the second signal includes the third device parses the second signal by using a first radio network temporary identifier, to obtain the first time domain resource position, where the first radio network temporary identifier is a radio network identifier used by a first remote terminal device to parse the second signal, and the first remote terminal device is a terminal device that receives the second signal. In other words, in some embodiments of this application, the third device can parse, by using the radio network temporary identifier used by the first remote terminal device to parse the second signal, the second signal received by the third device.

In a possible design, the second signal is a first downlink control message carried on a first physical downlink control channel, and the first signal is first downlink data carried on a first physical downlink shared channel, the second signal is a second downlink control message carried on a second physical downlink control channel, and the first signal is first uplink data carried on a first physical uplink shared channel, the second signal is a RAR, and the first signal is a message 3 in a random access process, or the second signal is second downlink data carried on a second physical downlink shared channel, and the first signal is a third downlink control message carried on a third physical downlink control channel.

In a possible design, the method further includes the third device determines a first common search space or a first terminal-specific search space corresponding to a second time domain resource position for transmitting the second signal; and the third device determines the first radio network temporary identifier based on the first common search space or the first terminal-specific search space and a pre-stored mapping relationship between the first radio network temporary identifier and the first common search space or the first terminal-specific search space. According to this solution, the third device can determine the first radio network temporary identifier.

In a possible design, the method further includes the third device parses a preamble carried on a physical random access channel to obtain the first radio network temporary identifier; or the third device parses third downlink data carried on a third physical downlink shared channel to obtain the first radio network temporary identifier. According to this solution, the third device can determine the first radio network temporary identifier.

In a possible design, the second signal is a master information block MIB, and the first signal is a system information block (SIB) 1; the second signal is a SIB 1, and the first signal is a SIB other the SIB 1; the second signal is a first system information block, and the first signal is a preamble carried on a physical random access channel; or the second signal is a second system information block, and the first signal is a fourth downlink control message carried on a fourth physical downlink control channel.

In a possible design, the first time domain resource position is a specified time domain resource position.

In a possible design, the first signal includes a synchronization signal, a master information block (MIB), or an SIB 1.

In a possible design, the method further includes the third device disables the signal amplification function at or after an end position of the first time domain position. According to this solution, the signal amplification function can be disabled in time when no signal needs to be forwarded. This can avoid the problem that amplified noise causes noise interference to the DeNB and the other terminal device when the DeNB does not send data to the remote terminal device, and therefore reduce noise interference.

In a possible design, the third device is in a persistent connection mode after being powered on and accessing a network.

In a possible design, the method further includes the third device receives a radio resource control (RRC) message from the network device, where the RRC message is used to notify the third device that system information changes.

According to a fourth aspect, a communication apparatus is provided to implement the foregoing methods. The communication apparatus may be the first device according to the first aspect, or an apparatus that includes the first device; or the communication apparatus may be the second device according to the second aspect, or an apparatus that includes the second device; or the communication apparatus may be the third device according to the third aspect, or an apparatus that includes the third device. The communication apparatus includes a corresponding module, unit, or means for implementing the foregoing method. The module, unit, or means may be implemented by using hardware or software, or implemented by hardware executing corresponding software. The hardware or the software includes one or more modules or units corresponding to the foregoing functions.

According to a fifth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the first device according to the first aspect, or an apparatus that includes the first device; or the communication apparatus may be the second device according to the second aspect, or an apparatus that includes the second device; or the communication apparatus may be the third device according to the third aspect, or an apparatus that includes the third device.

According to a sixth aspect, a communication apparatus is provided. The communication apparatus includes a processor. The processor is configured to: be coupled to a memory; and after reading instructions in the memory, perform the method according to any one of the foregoing aspects according to the instructions. The communication apparatus may be the first device according to the first aspect, or an apparatus that includes the first device; or the communication apparatus may be the second device according to the second aspect, or an apparatus that includes the second device; or the communication apparatus may be the third device according to the third aspect, or an apparatus that includes the third device.

According to a seventh aspect, a computer-readable storage medium is provided. The computer-readable storage medium stores instructions. When the instructions are run on a computer, the computer is enabled to perform the method according to any one of the foregoing aspects.

According to an eighth aspect, a computer program product including instructions is provided. When the computer program product runs on a computer, the computer is enabled to perform the method according to any one of the foregoing aspects.

According to a ninth aspect, a communication apparatus is provided (for example, the communication apparatus may be a chip or a chip system). The communication apparatus includes a processor, configured to implement a function according to any one of the foregoing aspects. In a possible design, the communication apparatus further includes a memory, and the memory is configured to store program instructions and data. When the communication apparatus is the chip system, the communication apparatus may include a chip, or may include a chip and another discrete component.

For technical effects brought by any design of the fourth aspect to the ninth aspect, refer to the technical effects brought by different designs of the first aspect or the third aspect. Details are not described herein again.

According to a tenth aspect, a communication system is provided. The communication system includes a first device and a second device. The first device is configured to: determine a first time domain resource position for transmitting a first signal; and send first control signaling to a second device at or before a start position of the first time domain resource position. The second device is configured to receive a first control signaling, and enable a signal amplification function of the second device according to the first control command. According to this solution, the first device can indicate, at or before the start position of the first time domain resource position for transmitting the first signal, the second device to enable the signal amplification function. To be specific, signal amplification is performed only when a signal needs to be forwarded, and the signal amplification function does not need to be enabled when no signal needs to be forwarded. This can avoid a problem that amplified noise causes noise interference to the DeNB and another terminal device when the DeNB does not send data to the remote terminal device, and therefore reduce noise interference.

In a possible design, the communication system provided in some embodiments of this application may further include a network device. The network device is configured to receive or send the first signal. The second device is further configured to amplify the first signal at the first time domain resource position. Optionally, the network device is further configured to send a second signal, where the second signal includes information used to indicate the first time domain resource position for transmitting the first signal.

In a possible design, the first device in some embodiments of this application is further configured to perform the signal processing method according to the first aspect, and the second device is further configured to perform the signal processing method according to the second aspect.

According to an eleventh aspect, a communication system is provided. The communication system includes a third device and a network device. The third device is configured to: determine a first time domain resource position for transmitting a first signal, and enable a signal amplification function of the third device at or before a start position of the first time domain resource position. The network device is configured to receive or send the first signal. The third device is further configured to amplify the first signal at the first time domain resource position. Generally, as a repeater is generally enabled, the repeater amplifies both wanted signals and noise. When a DeNB does not send data to a remote terminal device, amplified noise causes noise interference to the DeNB and another terminal device. According to this solution, the third device can determine the first time domain resource position for transmitting the first signal, and enable the signal amplification function of the third device at or before the start position of the first time domain resource position. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

In a possible design, the network device is further configured to send a second signal to the third device.

In a possible design, the third device is further configured to perform the signal processing method according to the third aspect.

DESCRIPTION OF EMBODIMENTS

For ease of understanding the solutions in the embodiments of this application, the following first provides brief descriptions or definitions of related technologies.

1. Search Space (SS)

A search space defines a possibility of detecting a physical downlink control channel (PDCCH) in time domain. For example, in a narrowband physical downlink control channel (NPDCCH) in an NB-IoT (Narrowband IoT) system, a terminal device needs to monitor an NPDCCH candidate set to obtain downlink control information (DCI). The NPDCCH candidate set is referred to as an NPDCCH search space. Resources in the NPDCCH search space are periodically distributed. A network device may indicate a periodicity of the NPDCCH search space and a start position of the NPDCCH search space in each periodicity to the terminal device via a system information block (SIB) or radio resource control (RRC) signaling. The terminal device blindly detects an NPDCCH in the NPDCCH search space based on the indication of the network device.

The system information block or the RRC signaling carries parameters $R_{max}$, $G$, and $\alpha_{offset}$. $R_{max}$ indicates a maximum quantity of repetitions of the NPDCCH search space. After receiving the system information block or the RRC signaling, the terminal device determines a product of $R_{max}$ and $G$ as the periodicity of the NPDCCH search space; determines $R_{max}$ as duration of the NPDCCH search space in each periodicity of the NPDCCH search space; and determines a product of $R_{max}$, $G$, and $\alpha_{offset}$ as a time-domain interval between a start position of the periodicity of the NPDCCH search space and a start position of the NPDCCH search space. To be specific, $G*R_{max}*\alpha_{offset}$ indicates that the start position of the NPDCCH search space is obtained by shifting from the start position of the periodicity of the NPDCCH search space backward by an offset of $G*R_{max}*\alpha_{offset}$ in time domain.

Figure 2:
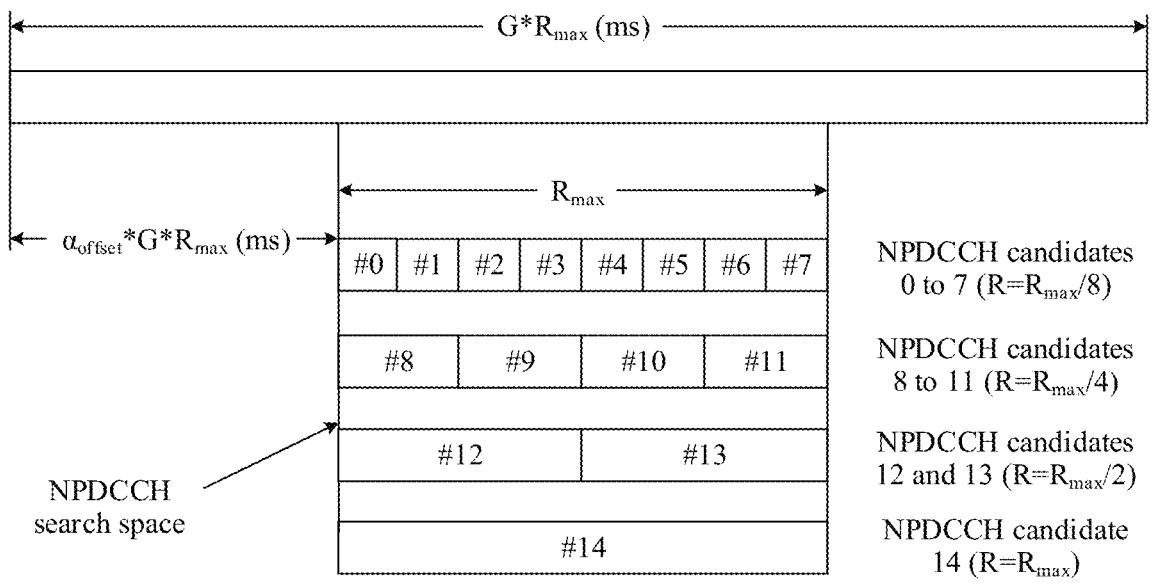
FIG. 2 is an example of a schematic diagram of an NPDCCH candidate according to an embodiment of this application.

There may be a plurality of NPDCCH candidates in one periodicity of the NPDCCH. FIG. 2 is an example of a schematic diagram of an NPDCCH candidate according to embodiments of this application. A periodicity of an NPDCCH search space is $G*R_{max}$, duration of the NPDCCH search space in $G*R_{max}$ is $R_{max}$ valid subframes, a time-domain interval between a start position of the periodicity of the NPDCCH search space and a start position of the NPDCCH search space is $G*R_{max}*\alpha$offset. There may be a maximum of 15 NPDCCH candidates in one periodicity of the NPDCCH search space, and a repetition level of each of the NPDCCH candidates is R. A repetition level R of each of the $0^{th}$ to the $7^{th}$ candidates is equal to $R_{max}/8$, and a length of each of the $0^{th}$ to the $7^{th}$ candidates in time domain is equal to $R_{max}/8$ (one eighth of $R_{max}$) valid subframes. A repetition level R of each of the $8^{th}$ to the $11^{th}$ candidates is equal to $R_{max}/4$, and a length of each of the $8^{th}$ to the $11^{th}$ candidates in time domain is equal to $R_{max}/4$ (one fourth of $R_{max}$) valid subframes. A repetition level R of either one of the $12^{th}$ and $13^{th}$ candidates is $R_{max}/2$, and a length of either one of the $12^{th}$ and $13^{th}$ candidates in time domain is equal to $R_{max}/2$ (that is, one half of $R_{max}$) valid subframes. A repetition level R of the $14^{th}$ candidate is equal to $R_{max}$, and a length of the $14^{th}$ candidate in time domain is equal to $R_{max}$ valid subframes.

It should be noted that in embodiments of this application, a definition of a valid subframe is related to a specific communication system. For example, in an NB-IoT system, a valid subframe may be referred to as an NB-IoT downlink subframe. In the following cases, it should be assumed that a subframe is an NB-IoT downlink subframe for a terminal device in the NB-IoT system.

For example, the terminal device determines that a subframe, in which transmission of a narrowband primary synchronization signal (NPSS), a narrowband secondary synchronization signal (NSSS), a narrowband physical broadcast channel (NPBCH), or a system information block type-NB (system information block type1-NB) is not included, is an NB-IoT downlink subframe. Alternatively, the terminal device receives a configuration parameter, and the configuration parameter is used to configure the NB-IoT downlink subframe. Further, the terminal device may determine the NB-IoT downlink subframe based on the configuration parameter. The configuration parameter may be configured via a system information block or RRC signaling. This is not specifically limited in the embodiments of this application.

For example, in an enhanced Machine Type Communication (eMTC) system, a valid subframe may be referred to as a bandwidth-reduced low-complexity or coverage enhanced (BL/CE) downlink subframe. The BL/CE downlink subframe may be configured by using a configuration parameter, and the configuration parameter is configured via a system information block or RRC signaling.

2. Repeater Protocol Stack Architecture

Figure 3:
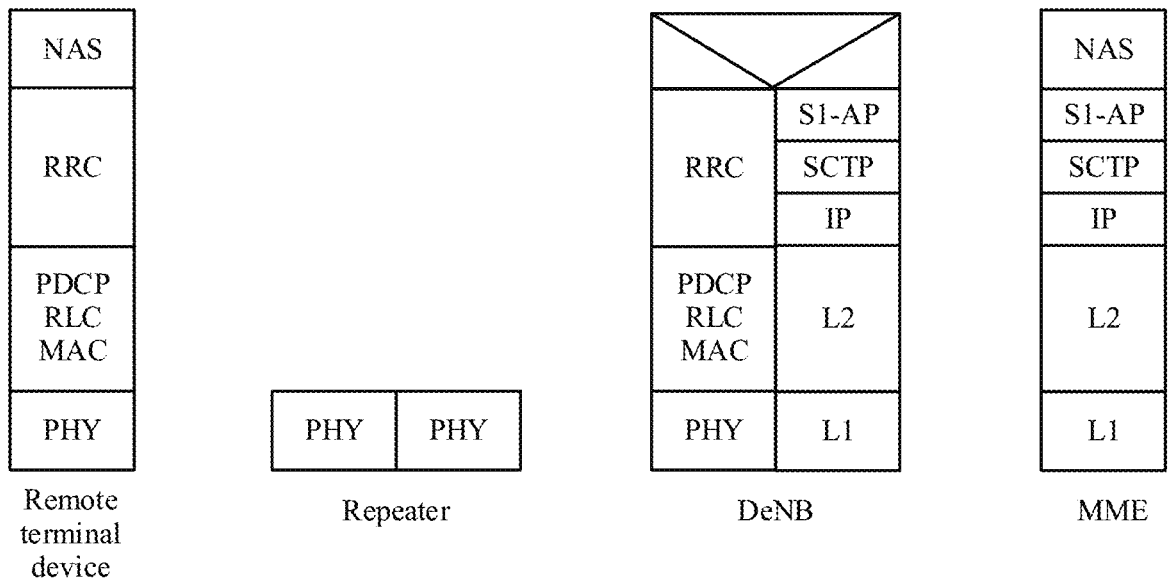
FIG. 3 is a schematic diagram of an architecture of a common repeater protocol stack.

FIG. 3 is a schematic diagram of an architecture of a repeater protocol stack. The repeater supports an air interface protocol stack of a physical (PHY) layer on a Uu interface facing a remote terminal device, and supports transmission on a Un air interface at the PHY layer on a backhaul link facing a DeNB. In addition, it can be learned from FIG. 3 that, a protocol stack of the remote terminal device sequentially includes a PHY layer, a media access control (MAC) layer, a radio link control (RLC) layer, a packet data convergence protocol (PDCP) layer, a radio resource control (RRC) layer, and a non-access stratum (NAS) from bottom to top. The DeNB faces the Un interface of the repeater, and a protocol stack of the DeNB sequentially includes a PHY layer, a MAC layer, an RLC layer, a PDCP layer, and an RRC layer from bottom to top. The DeNB faces a mobility management entity, and a protocol stack of the mobility management entity (MME) sequentially includes a L1 (level1) layer, an L2 layer, an internet protocol (IP) layer, a stream control transmission protocol (SCTP) layer, and an S1 application protocol (S1-AP) layer from bottom to top. A protocol stack that is of the MME and that faces the DeNB sequentially includes an L1 layer, an L2 layer, an IP layer, an SCTP layer, an S1-AP layer, and a NAS layer from bottom to top. For related descriptions of the protocol stack of the remote terminal device, the protocol stack of the DeNB, and the protocol stack of the MME, refer to a communication protocol. Details are not described herein.

Figure 1:
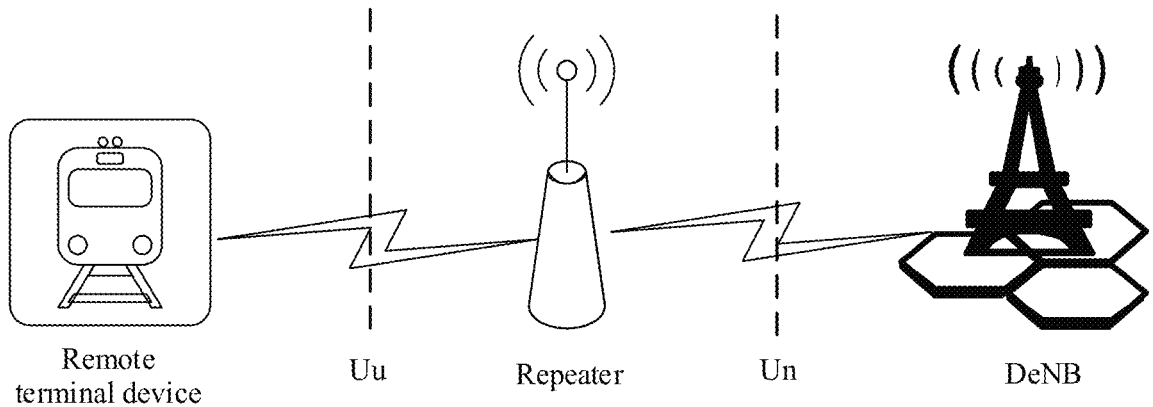
FIG. 1 is a schematic diagram of a network architecture of a common relay system, according to an embodiment of this application.

It can be learned from the network architecture shown in FIG. 1 and the protocol stack architecture shown in FIG. 3, a repeater combines functions of a DeNB and a terminal device. A power of a signal transmitted over a link is gradually attenuated due to losses, and the signal is distorted after being attenuated to some extent, and consequently is incorrectly received. The repeater is designed to resolve this problem. The repeater, which is a simple and cost-effective interconnection device, is configured to extend a network distance in a local area network environment. The repeater has functions of performing physical layer functions, transferring information by bits between two nodes at physical layers, and implementing signal duplication, adjustment, and amplification, to extend the network distance.

The following describes the technical solutions in the embodiments of this application with reference to the accompanying drawings in the embodiments of this application. Unless otherwise specified, "/" in descriptions of this application represents an "or" relationship between associated objects. For example, A/B may represent A or B. A and B may be singular or plural. In addition, in the descriptions of this application, "a plurality of" means two or more, unless otherwise specified. "At least one of the following items (pieces)" or a similar expression thereof indicates any combination of these items, including a singular item (piece) or any combination of plural items (pieces). For example, at least one of a, b, or c may indicate: a; b; c; a and b; a and c; b and c; or a, b, and c; where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in the embodiments of this application, the word such as "example" or "for example" is used to represent giving an example, an illustration, or a description. Any embodiment or design scheme described as an "example" or with "for example" in the embodiments of this application should not be explained as being more preferred or having more advantages than another embodiment or design scheme. Exactly, use of the word "example", "for example", or the like is intended to present a relative concept in a specific manner for ease of understanding.

The technical solutions of the embodiments of the present disclosure are applicable to various communication systems, including a long term evolution (LTE) system, for example, an NB-IoT system or an enhanced machine type communication (eMTC) system; and another wireless communication system, for example, a global system for mobile communications (global system for mobile communication, GSM), a mobile communication system (universal mobile telecommunications system, UMTS), a code division multiple access (CDMA) system, a $5^{th}$ generation (5G) system, or a future communication system. This is not specifically limited in embodiments of this application. In the embodiments of this application, terms "system" and "network" may be interchangeable. Unified descriptions are provided herein, and details are not described below again.

Figure 4:
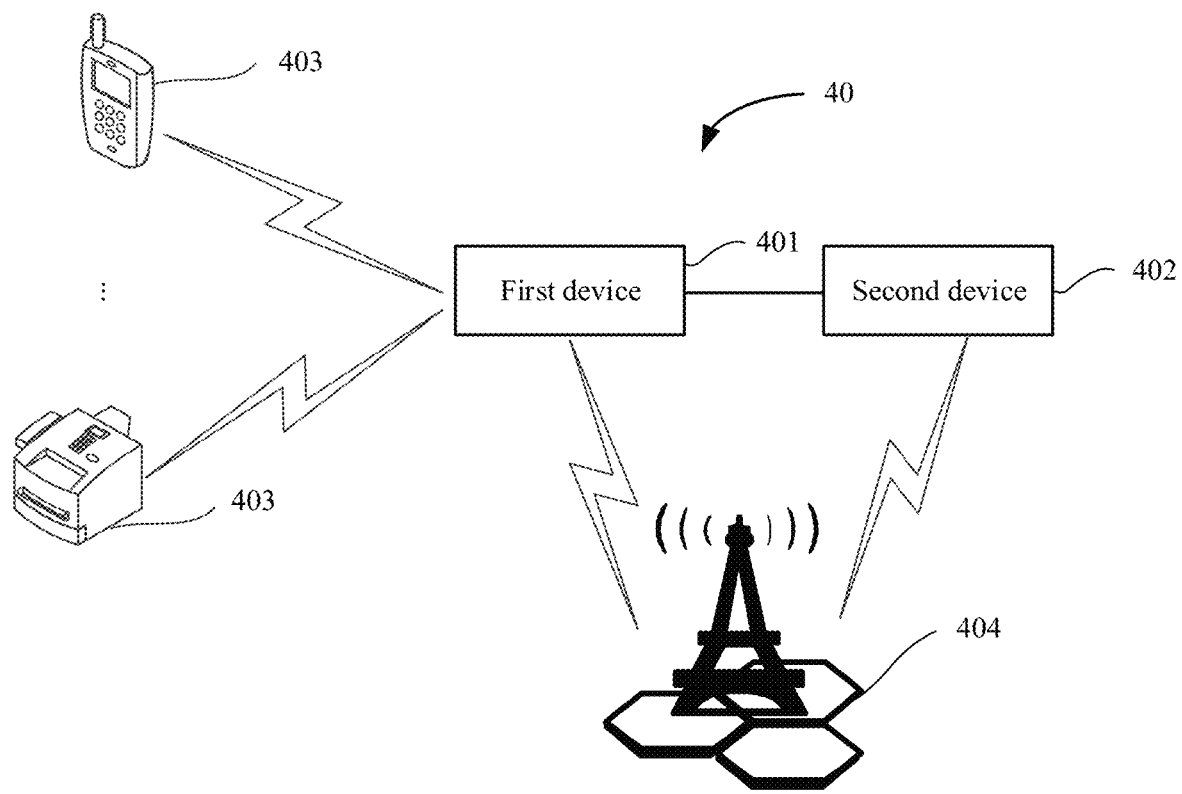
FIG. 4 is a schematic diagram of an architecture of a communication system according to an embodiment of this application.

FIG. 4 shows a communication system 40 according to embodiments of this application. The communication system 40 includes a first device 401 and a second device 402. The first device 401 is configured to: determine a first time domain resource position for transmitting a first signal, and send first control signaling to the second device 402 at or before a start position of the first time domain resource position, where the first control signaling is used to enable a signal amplification function of the second device 402. The second device 402 is configured to: receive the first control signaling from the first device 401, and enable the signal amplification function of the second device 402 according to the first control signaling. Specific implementations of this solution are described in subsequent method embodiments. Details are not described herein.

Optionally, the first device in the embodiments of this application may be a terminal device or a chip in the terminal device.

Optionally, the second device in the embodiments of this application may be a layer 1 relay. The second device may also be referred to as, for example, a repeater or a relay, and is mainly configured to amplify and resend or forward an attenuated signal.

Optionally, as shown in FIG. 4, the communication system 40 provided in these embodiments of this application may further include a network device 404 and one or more remote terminal devices 403. The remote terminal device 403 establishes a communication connection to the network device 404 through the second device 402. For example, the remote terminal device 403 sends the first signal to the network device 404 through the second device 402, or the network device 404 sends the first signal to the remote terminal device 403 through the second device 402. This is not specifically limited to these embodiments of this application.

Generally, as the repeater is generally enabled, the repeater amplifies both wanted signals and noise. When a DeNB does not send data to the remote terminal device, amplified noise causes noise interference to the DeNB and another terminal device. According to the communication system according to these embodiments of this application, the first device can indicate, at or before the start position of the first time domain resource position for transmitting the first signal, the second device to enable the signal amplification function. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

Figure 5:
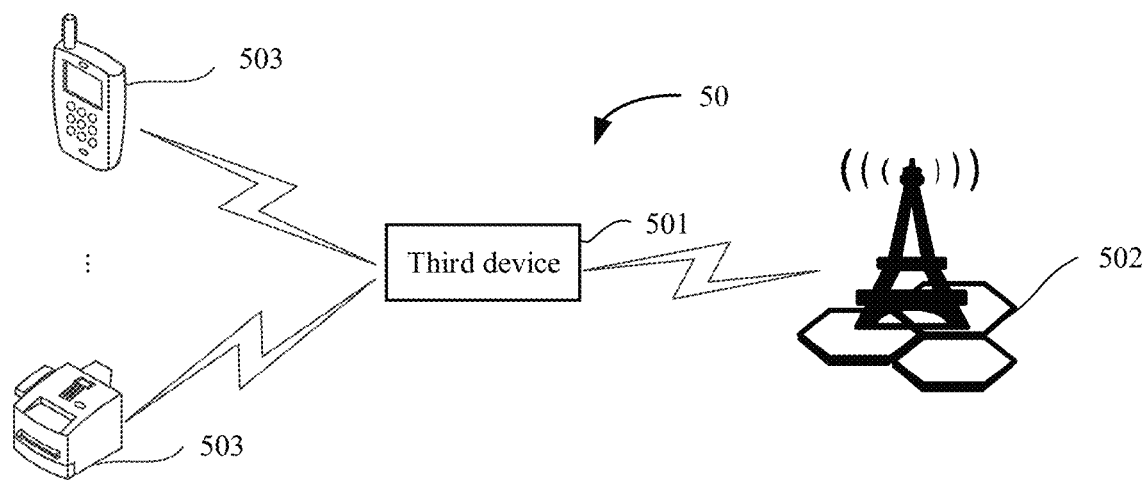
FIG. 5 is a schematic diagram of an architecture of another communication system according to an embodiment of this application.

FIG. 5 shows another communication system 50 according to embodiments of this application. The communication system 50 includes a third device 501 and a network device 502. The third device 501 is configured to: determine a first time domain resource position for transmitting a first signal, and enable a signal amplification function of the third device at or before a start position of the first time domain resource position. The network device 502 is configured to receive or send the first signal.

Optionally, the third device in these embodiments of this application may be a device in which the first device and the second device are integrated or combined.

Optionally, as shown in FIG. 5, the communication system 50 may further include one or more remote terminal devices 503. The remote terminal device 503 establishes a communication connection to the network device 502 through the third device 501. For example, the remote terminal device 503 sends the first signal to the network device 502 through the third device 501, or the network device 502 sends the first signal to the remote terminal device 503 through the third device 501. This is not specifically limited to these embodiments of this application.

Optionally, in these embodiments of this application, there may be one or more third devices 501 between the network device 502 and the remote terminal device 503. The one or more third devices 501 may be understood as one or more relay node devices between the network device 502 and the remote terminal device 503, and are responsible for forwarding a radio signal for one or more times, which means that the radio signal reaches the terminal device through a plurality of hops. A simple two-hop relay is used as an example. To be specific, a "network device-remote terminal device" link is divided into two links: a "network device-third device" link and a "third device-remote terminal device" link. In this way, there is an opportunity to replace one poorer-quality link with two better-quality links, so that a higher link capacity and better coverage are obtained. This reduces power consumption of the terminal device.

Generally, as a repeater is generally enabled, the repeater amplifies both wanted signals and noise. When a DeNB does not send data to the remote terminal device, amplified noise causes noise interference to the DeNB and another terminal device. According to the communication system according to these embodiments of this application, the third device can determine the first time domain resource position for transmitting the first signal, and enable the signal amplification function of the third device at or before the start position of the first time domain resource position. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

It should be noted that, in embodiments of this application, the first time domain resource position that is for transmitting the first signal and that is determined by the first device or the third device may be an actual time domain resource position for transmitting the first signal, or may be a possible position area including the actual time domain resource position for transmitting the first signal. For example, assuming that the first signal is a downlink control message carried on a physical downlink control channel, the first time domain resource position is actually a physical downlink control channel search space, that is, the signal amplification function needs to be generally enabled in the physical downlink control channel search space. For related descriptions of the physical downlink control channel search space, refer to the introduction in DESCRIPTION OF EMBODIMENTS. Details are not described herein again. Alternatively, for example, assuming that the first signal is uplink data, downlink data, a synchronization signal, a system information block, or a master information block (master information, MIB), the first time domain resource position is an actual time domain resource position for transmitting the first signal. Unified descriptions are provided herein, and details are not described below again.

It should be noted that the signal amplification function in the embodiments of this application may also be referred to as a signal relay function, a relay function, or the like. Unified descriptions are provided herein, and details are not described below again.

Optionally, the network device in the embodiments of this application is a device configured to communicate with a terminal device. The network device may be any device having a wireless transceiver function or a chip that may be disposed in the device. The device includes but is not limited to an evolved NodeB (evolved node B, eNB), a radio network controller (RNC), a NodeB (node B, NB), a donor evolved NodeB (DeNB), a base station controller (BSC), a base transceiver station (BTS), a home base station (for example, a home evolved nodeB or a home node B, an HNB), a baseband unit (base band unit, BBU), an access point (AP) in a wireless fidelity (Wi-Fi) system, a wireless relay node, a wireless backhaul node, a transmission point (TP) or a transmission reception point (transmission and reception point, TRP), or the like. The network device may alternatively be a next generation NB (generation, gNB) or a transmission point (for example, a TRP or a TP) in a 5G system, for example, a new radio (NR) system, or one antenna panel or a group of antenna panels (including a plurality of antenna panels) of a base station in a 5G system, or may be a network node, for example, a BBU or a distributed unit (DU), that constitutes a gNB or a transmission point.

In some deployments, the gNB may include a centralized unit (CU) and a DU. The gNB may further include a radio unit (RU). The CU implements a part of functions of the gNB, and the DU implements a part of functions of the gNB. For example, the CU implements functions of an RRC layer and a PDCP layer, and the DU implements functions of an RLC layer, a MAC layer, and a PHY layer. Information at the RRC layer eventually becomes information at the PHY layer, or is converted from information at the PHY layer. Therefore, in this architecture, it may also be considered that higher layer signaling, such as RRC layer signaling or PHCP layer signaling, may be sent by the DU or sent by the DU and the RU. It can be understood that the network device may be a CU node, a DU node, or a device including a CU node and a DU node. In addition, the CU may be classified as a network device in an access network, or the CU may be classified as a network device in a core network (CN). This is not limited herein.

Optionally, the terminal device or the remote terminal device in embodiments of this application may be a device, for example, a terminal or a chip that may be disposed in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in an LTE system, an NR system, or a future evolved PLMN. An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device and the remote terminal device in embodiments of this application may also be referred to as communication apparatuses. The communication apparatus may be a general-purpose device or a special-purpose device. This is not specifically limited in the embodiments of this application.

Optionally, related functions of the first device 401, the second device 402, or the third device 501 in the embodiments of this application may be implemented by one device, or may be jointly implemented by a plurality of devices, or may be implemented by one or more functional modules in one device. This is not specifically limited in the embodiments of this application. It may be understood that the foregoing function may be a network element in a hardware device, a software function running on dedicated hardware, a combination of hardware and software, or a virtualization function instantiated on a platform (for example, a cloud platform).

Figure 6:
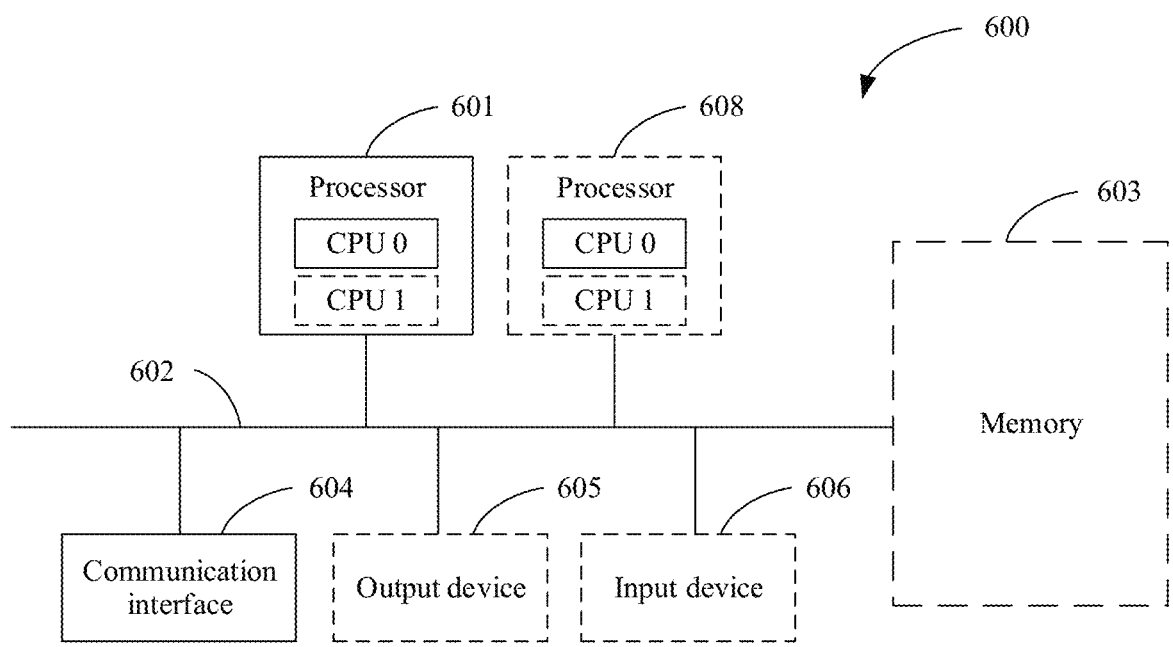
FIG. 6 is a schematic diagram of a structure of a communication apparatus according to an embodiment of this application.

For example, the related functions of the first device 401, the second device 402, or the third device 501 in embodiments of this application may be implemented by using a communication apparatus 600 in FIG. 6. FIG. 6 is a schematic diagram of a structure of the communication apparatus 600 according to embodiments of this application. The communication apparatus 600 includes one or more processors 601, a communication line 602, and at least one communication interface (where an example in which a communication interface 604 and one processor 601 are included is merely is used for description in FIG. 6). Optionally, the communication apparatus 600 may further include a memory 603.

The processor 601 may be a general-purpose central processing unit (CPU), a microprocessor, an application-specific integrated circuit (ASIC), or one or more integrated circuits configured to control program execution of the solutions in this application.

The communication line 602 may include a path for connecting different components.

The communication interface 604 may be a transceiver module, configured to communicate with another device or a communication network, for example, the Ethernet, a RAN, or a wireless local area network (WLAN). For example, the transceiver module may be an apparatus such as a transceiver or a transceiver machine. Optionally, the communication interface 604 may alternatively be a transceiver circuit located in the processor 601, and is configured to implement signal input and signal output of the processor.

The memory 603 may be an apparatus having a storage function. For example, the memory 603 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a Blu-ray disc, or the like), a magnetic disk storage medium or another magnetic storage device, or any other medium that can be configured to carry or store expected program code in a form of instructions or a data structure and that can be accessed by a computer. However, the memory 603 is not limited thereto. The memory may exist independently, and may be connected to the processor through the communication line 602. Alternatively, the memory may be integrated with the processor.

The memory 603 is configured to store computer-executable instructions for performing the solutions of this application, and the execution is controlled by the processor 601. The processor 601 is configured to execute the computer-executable instructions stored in the memory 603, to implement a signal processing method according to the embodiments of this application.

Alternatively, in these embodiments of this application, the processor 601 may perform a processing-related function in the signal processing method according to the following embodiments of this application. The communication interface 604 is responsible for communicating with another device or a communication network. This is not specifically limited in these embodiments of this application.

The computer-executable instructions in these embodiments of this application may also be referred to as application program code. This is not specifically limited in these embodiments of this application.

During specific implementation, in embodiments, the processor 601 may include one or more CPUs, for example, a CPU 0 and a CPU 1 in FIG. 6.

During specific implementation, in embodiments, the communication apparatus 600 may include a plurality of processors, for example, the processor 601 and a processor 608 shown in FIG. 6. Each of the processors may be a single-core (single-CPU) processor or a multi-core (multi-CPU) processor. Herein, the processor may be one or more devices, circuits, and/or processing cores configured to process data (for example, computer program instructions).

During specific implementation, in embodiments, the communication apparatus 600 may further include an output device 605 and an input device 606. The output device 605 communicates with the processor 601, and may display information in a plurality of manners.

The communication apparatus 600 may be a general-purpose apparatus or a dedicated apparatus. For example, the communication apparatus 600 may be a desktop computer, a portable computer, a network server, a PDA, a mobile phone, a tablet computer, a wireless terminal device, an embedded device, or a device having a structure similar to that in FIG. 4. A type of the communication apparatus 600 is not limited in these embodiments of this application.

With reference to FIG. 1 to FIG. 6, the following describes in detail a communication method according to embodiments of this application.

First, brief descriptions of a first signal on which signal amplification needs to be performed in the embodiments of this application are provided as follows:

The first signal in the embodiments of this application may include, for example, uplink data carried on a physical downlink shared channel or downlink data carried on a physical downlink shared channel. In this case, information indicating a first time domain resource position for transmitting the first signal may be obtained by decoding downlink control information carried on a physical downlink control channel.

Alternatively, the first signal in the embodiments of this application may include, for example, downlink control information carried on a physical downlink control channel. In this case, information indicating a first time domain resource position for transmitting the first signal may be obtained by using an SIB.

Alternatively, the first signal in the embodiments of this application may include, for example, a synchronization signal, and the synchronization signal may include an NPSS or an NSSS. The NPSS is located in a subframe 5 of each radio frame, and the NSSS is located in a subframe 9 at an interval of one radio frame (a subframe 9 of an even-numbered radio frame). It may also be understood that a first time domain resource position for transmitting the NPSS and the NSSS is a specified time domain resource position.

Alternatively, the first signal in the embodiments of this application may include, for example, a MIB. In an NB-IoT system, the MIB is carried by an NPBCH, and is located in a subframe 0 of each radio frame. It may also be understood that a first time domain resource position for transmitting the MIB is a specified time domain resource position.

Alternatively, the first signal in the embodiments of this application may include, for example, a SIB. SIBs include a SIB 1 and another SIB. The other SIB herein may include, for example, a SIB 2, a SIB 3, a SIB 4, a SIB 5, a SIB 14, a SIB 15, a SIB 16, a SIB 20, a SIB 22, or a SIB 23. In an NB-IoT system, the SIB 1 is located in a subframe 4 of a radio frame, but a radio frame position for transmitting the SIB 1 needs to be determined based on scheduling information that is of the SIB 1 and that is in an MIB. In other words, in the NB-IoT system, information indicating a first time domain resource position for transmitting the SIB 1 is carried in the MIB. A position for transmitting the other SIB is scheduled by using the SIB 1, that is, information indicating a first time domain resource position for transmitting the other SIB is carried in the SIB 1. In an LTE system, a time domain resource position of the SIB 1 is fixed, a periodicity of the SIB 1 is 80 ms, and the SIB 1 is repeatedly sent in a subframe 5 of an even-numbered frame in each periodicity. A position and a periodicity for transmitting the other SIB are scheduled by using the SIB 1, and the SIB 1 indicates a time domain position and a length of an SI window of the other SIB, but does not directly indicate subframes, in the SI window, in which the other SIB is scheduled. A subframe, in the SI window, in which there is the other SIB may be determined by decoding downlink control information carried on a physical downlink control channel in the subframe. In other words, information indicating a first time domain resource position for transmitting the other SIB is carried in the SIB 1 and the downlink control information carried on the physical downlink control channel.

Alternatively, the first signal in the embodiments of this application may include, for example, a reference signal. The reference signal includes a cell-specific reference signal (cell reference signal, CRS), a narrowband reference signal (NRS), or a modulation reference signal (demodulation reference signal, DMRS). A position for transmitting the reference signal may be obtained by using a SIB, that is, information indicating a first time domain resource position for transmitting the reference signal is carried in the SIB.

Alternatively, the first signal in the embodiments of this application may include, for example, a paging message. A terminal device detects, in a blind detection manner, a physical downlink control channel only in a physical downlink control channel search space in which a subframe (which may also be referred to as a paging occasion (PO) position below) in which a PO in one discontinuous reception (DRX) cycle is located is a start subframe. However, for a network device, a plurality of POs may be configured in one DRX cycle. Therefore, physical downlink control channels on the plurality of POs need to be amplified during signal amplification. In other words, a time domain resource position for transmitting the first signal herein is a possible position area including an actual time domain resource position for transmitting the first signal, namely, a position of a physical downlink control channel search space in which positions of the plurality POs are start subframes. Paging configuration information may be obtained by using a SIB, for example, a SIB 2 or a SIB 22. In other words, information indicating a first time domain resource position for transmitting the paging message is carried in the SIB.

Alternatively, the first signal in the embodiments of this application may include, for example, messages in a random access process. For example, the first signal may include a preamble, a random access response (RAR), a message 3, and a message 4 in the random access process. For a specific procedure of the random access process, refer to a common random access procedure. Details are not described herein. A time domain resource position of a physical random access channel carrying the preamble may be configured in a SIB. For example, information indicating a first time domain resource position for transmitting the preamble is configured in a SIB 2/SIB 22/SIB 23, information indicating a first time domain resource position for transmitting the RAR or the message 4 is carried in downlink control information on a physical downlink control channel, and information indicating a first time domain resource position for transmitting the message 3 is carried in the RAR.

It should be noted that a signal including the information used to indicate the first time domain resource position for transmitting the first signal may also be referred to as a second signal. For example, when the first signal is uplink data carried on a physical downlink shared channel or downlink data carried on a physical downlink shared channel, the second signal is downlink control information carried on a physical downlink control channel; or when the first signal is a reference signal, a paging message, a preamble in a random access process, or downlink control information carried on a physical downlink control channel, the second signal is a SIB; or when the first signal is a SIB 1, the second signal is an MIB; or when the first signal is another SIB, the second signal is a SIB 1; or when the first signal is a RAR or a message 4 in a random access process, the second signal is downlink control information carried on a physical downlink control channel; or when the first signal is a message 3 in a random access process, the second signal is a RAR. Unified descriptions are provided herein, and details are not described below again.

It should be noted that, in embodiments of this application, the first time domain resource position for the first signal may be a superframe granularity, a radio frame granularity, a subframe granularity, a slot granularity, a symbol granularity, or the like. In other words, the first time domain resource position for the first signal may occupy at least one superframe, or the first time domain resource position for the first signal may occupy at least one radio frame, or the first time domain resource position for the first signal may occupy at least one subframe, or the first time domain resource position for the first signal may occupy at least one slot, or the first time domain resource position for the first signal may occupy at least one symbol. Unified descriptions are provided herein, and details are not described below again.

Figure 7:
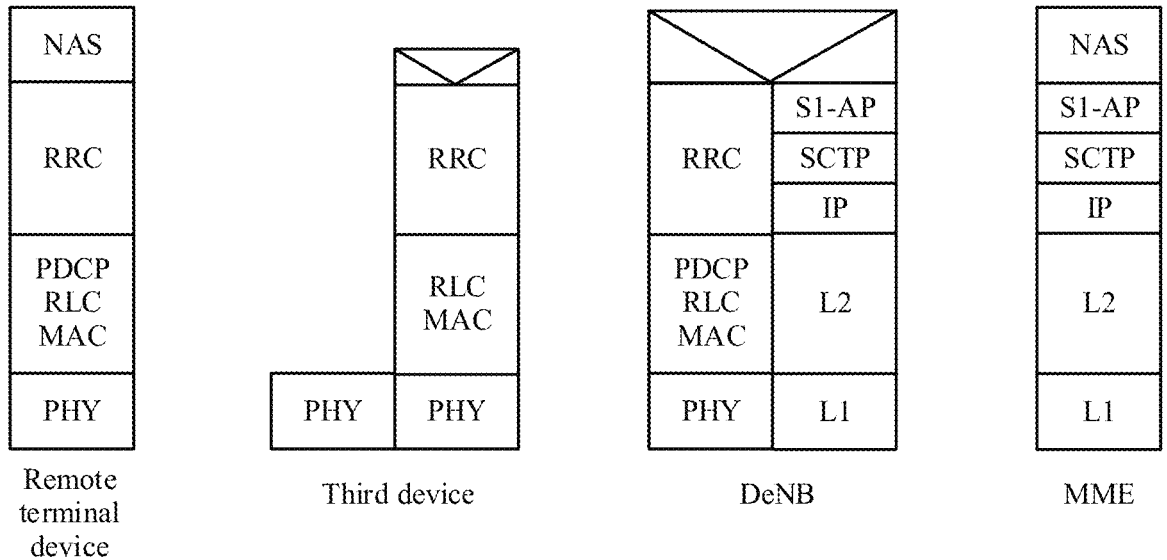
FIG. 7 is a schematic diagram of a possible architecture of a protocol stack according to an embodiment of this application.

Second, for the communication system shown in FIG. 4 or FIG. 5, several possible protocol stack architectures are provided as follows:

For the communication system shown in FIG. 5, FIG. 7 shows a possible protocol stack architecture. On a Uu interface facing the remote terminal device, the third device supports an air interface protocol stack of a PHY layer. On a backhaul link facing the DeNB, a protocol stack of the Qthird device sequentially includes a PHY layer, a MAC layer, an RLC layer, and an RRC layer from bottom to top. Optionally, the protocol stack of the third device may further include a PDCP layer (not shown). This is not specifically limited in the embodiments of this application.

Figure 8:
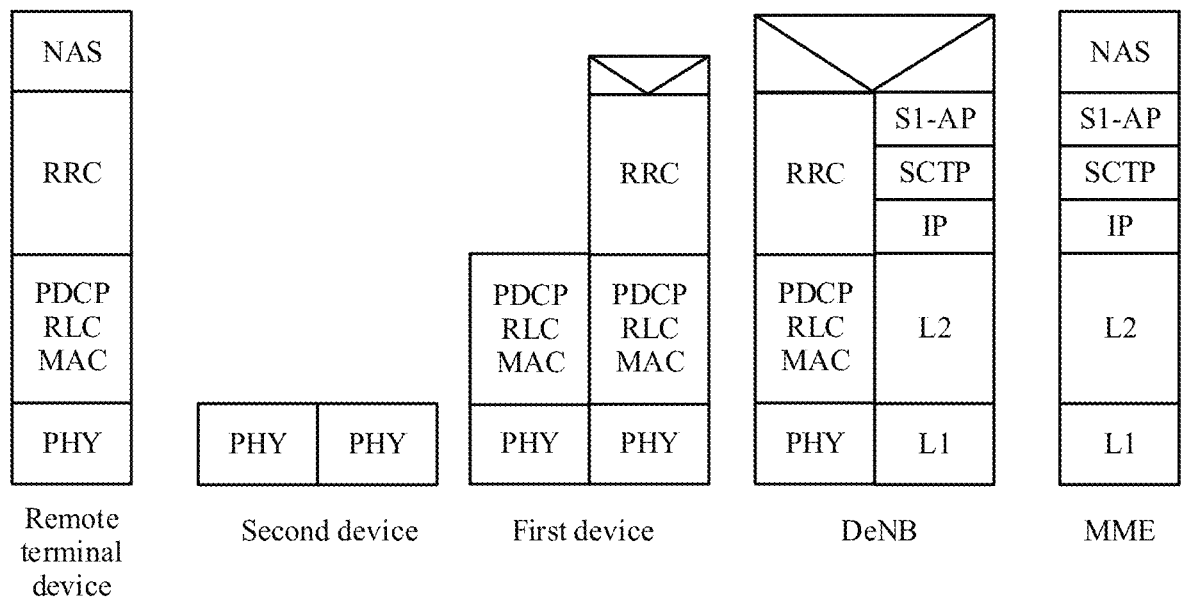
FIG. 8 is a schematic diagram of another possible architecture of a protocol stack according to an embodiment of this application.

For the communication system shown in FIG. 4, FIG. 8 shows a possible protocol stack architecture. On an air interface facing the remote terminal device, the first device sequentially supports a PHY layer, a MAC layer, an RLC layer, and a PDCP layer from bottom to top, where the PDCP layer and the RLC layer are optional. On an air interface facing the DeNB, the first device sequentially supports a PHY layer, a MAC layer, an RLC layer, a PDCP layer, and an RRC layer from bottom to top, where the PDCP layer is optional. The second device supports only the PHY layer on the air interface facing the remote terminal device or the air interface facing the DeNB.

Figure 9:
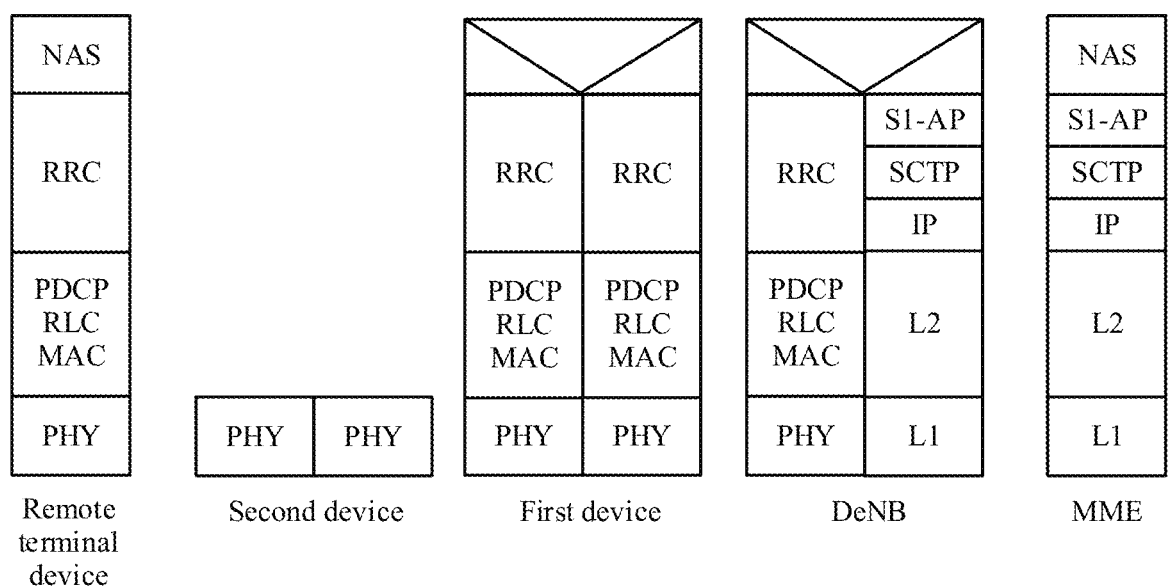
FIG. 9 is a schematic diagram of still another possible architecture of a protocol stack according to an embodiment of this application.

For the communication system shown in FIG. 4, FIG. 9 shows another possible protocol stack architecture. On an air interface facing the remote terminal device, the first device sequentially supports a PHY layer, a MAC layer, an RLC layer, a PDCP layer, and an RRC layer from bottom to top. On an air interface facing the DeNB, the first device sequentially supports a PHY layer, a MAC layer, an RLC layer, a PDCP layer, and an RRC layer from bottom to top, where the PDCP layer is optional. The second device supports only the PHY layer on the air interface facing the remote terminal device or the air interface facing the DeNB.

It should be noted that the protocol stack architectures shown in FIG. 7 to FIG. 9 are merely examples for description. Certainly, for the communication system shown in FIG. 4 or FIG. 5, there may be another protocol stack architecture. This is not specifically limited in the embodiments of this application.

Optionally, in the embodiments of this application, before signal processing is performed, the first device or the third device needs to first send a connection establishment request to the network device. The connection establishment request carries indication information of the first device or the third device, so that the network device identifies the first device based on the indication information of the first device or identifies the third device based on the indication information of the third device. For example, the indication information of the first device may be, for example, a cell radio network temporary identifier (C-RNTI) of the first device, and the indication information of the third device may be, for example, a C-RNTI of the third device. Certainly, authentication and authentication may further be performed on the first device or the third device by a core network, to ensure that the first device or the third device is an authorized device. This is not specifically limited in the embodiments of this application.

For example, the network device in the embodiments of this application may be, for example, a DeNB. For related descriptions of the first device and the third device, refer to the communication system part. Details are not described herein again.

With reference to some specific scenarios, the following provides an example of a procedure of the signal processing method according to the embodiments of this application.

It should be noted that names of messages between network elements, names of parameters in the messages, or the like in the following embodiments of this application are merely examples, and there may be other names in a specific implementation. This is not specifically limited in the embodiments of this application.

Based on the communication system architecture shown in FIG. 4, a signal processing method according to embodiments of this application is provided by using an NB-IoT system as an example.

Figure 10A:
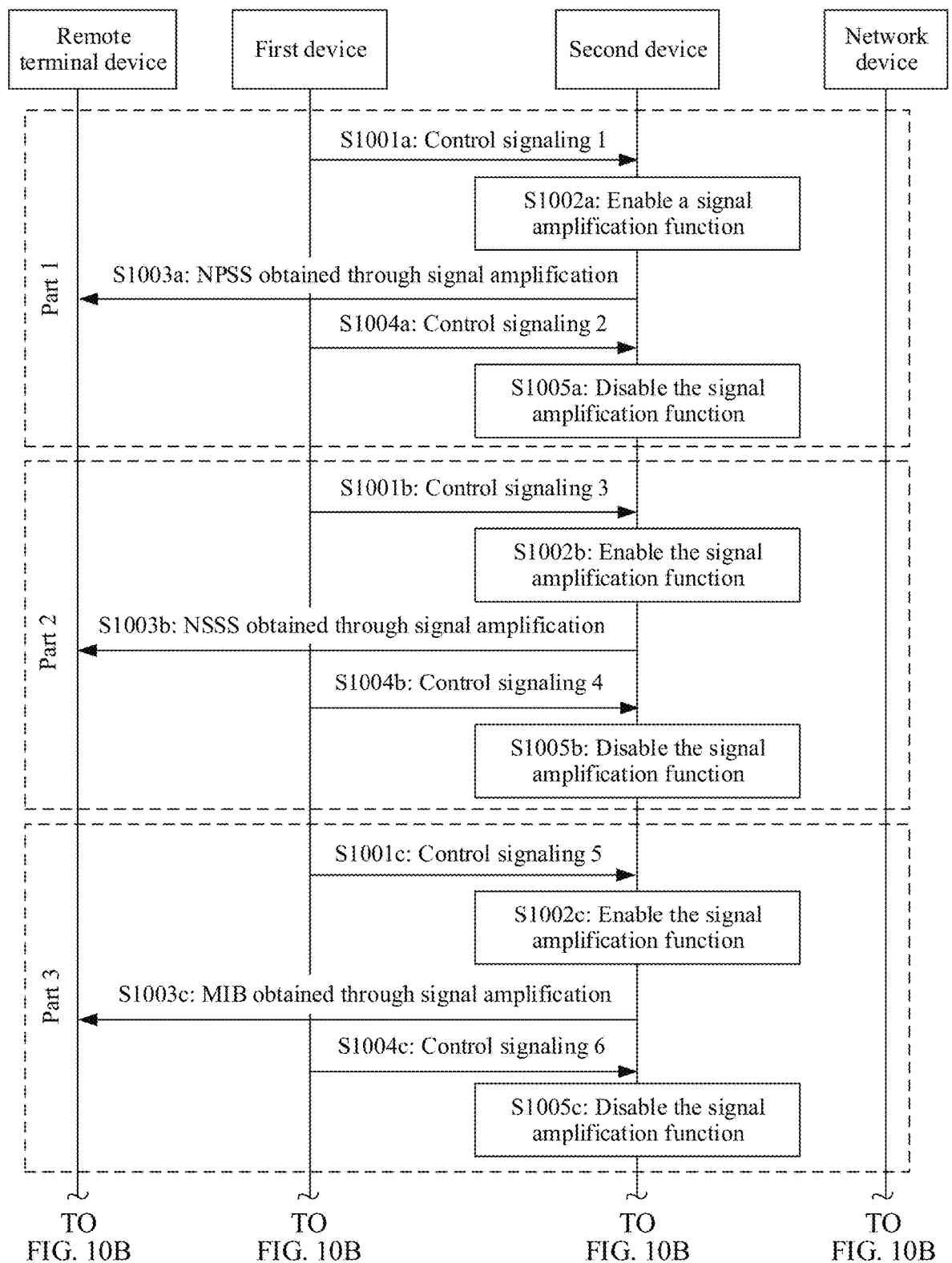
FIG. 10A and FIG. 10B are a schematic flowchart of a signal processing method according to an embodiment of this application.

Part 1 in FIG. 10A shows a procedure for processing an NPSS, and includes the following steps.

S1001a: The first device sends control signaling 1 to the second device in or before a subframe 5 of each radio frame. Correspondingly, the second device receives the control signaling 1 from the first device in or before the subframe 5 of each radio frame, where the control signaling 1 is used to enable the signal amplification function of the second device.

For example, for related descriptions of the second device in these embodiments of this application, refer to the communication system part. Details are not described herein again.

S1002a: The second device enables the signal amplification function in or before the subframe 5 of each radio frame based on the control signaling 1.

S1003a: The second device performs signal amplification on the NPSS in the subframe 5 of each radio frame, and sends the NPSS obtained through signal amplification to a first remote terminal device. Correspondingly, the first remote terminal device receives, from the second device, the NPSS obtained through signal amplification.

S1004a: The first device sends control signaling 2 to the second device in or after the subframe 5 of each radio frame. Correspondingly, the second device receives the control signaling 2 from the first device in or after the subframe 5 of each radio frame, where the control signaling 2 is used to disable the signal amplification function of the second device.

S1005a: The second device disables the signal amplification function in or after the subframe 5 of each radio frame based on the control signaling 2.

It should be noted that, in these embodiments of this application, a sending time point of the control signaling 2 is later than a sending time point of the control signaling 1. For example, if the first device sends the control signaling 1 to the second device in the subframe 5 of each radio frame, the first device sends the control signaling 2 to the second device after the subframe 5 of each radio frame. Alternatively, if the first device sends the control signaling 1 to the second device before the subframe 5 of each radio frame, the first device sends the control signaling 2 to the second device in or after the subframe 5 of each radio frame. Unified descriptions are provided herein, and details are not described below again.

Part 2 in FIG. 10A shows a procedure for processing an NSSS, and includes the following steps.

S1001b: The first device sends control signaling 3 to the second device in or before a subframe 9 at an interval of one radio frame. Correspondingly, the second device receives the control signaling 3 from the first device in or before the subframe 9 at the interval of one radio frame, where the control signaling 3 is used to enable the signal amplification function of the second device.

S1002b: The second device enables the signal amplification function in or before the subframe 9 at the interval of one radio frame based on the control signaling 3.

S1003b: The second device performs signal amplification on the NSSS in the subframe 9 at the interval of one radio frame, and sends the NSSS obtained through signal amplification to the first remote terminal device. Correspondingly, the first remote terminal device receives, from the second device, the NSSS obtained through signal amplification.

S1004b: The first device sends control signaling 4 to the second device in or after the subframe 9 at the interval of one radio frame. Correspondingly, the second device receives the control signaling 4 from the first device in or after the subframe 9 at the interval of one radio frame, where the control signaling 4 is used to disable the signal amplification function of the second device.

S1005b: The second device disables the signal amplification function in or after the subframe 9 at the interval of one radio frame based on the control signaling 4.

It should be noted that, in these embodiments of this application, a sending time point of the control signaling 4 is later than a sending time point of the control signaling 3. For example, if the first device sends the control signaling 3 to the second device in the subframe 9 at the interval of one radio frame, the first device sends the control signaling 4 to the second device after the subframe 9 at the interval of one radio frame. Alternatively, if the first device sends the control signaling 3 to the second device before the subframe 9 at the interval of one radio frame, the first device sends the control signaling 4 to the second device in or after the subframe 9 at the interval of one radio frame. Unified descriptions are provided herein, and details are not described below again.

Part 3 in FIG. 10A shows a procedure for processing an MIB, and includes the following steps.

S1001c: The first device sends control signaling 5 to the second device in or before a subframe 0 of each radio frame. Correspondingly, the second device receives the control signaling 5 from the first device in or before the subframe 0 of each radio frame, where the control signaling 5 is used to enable the signal amplification function of the second device.

S1002c: The second device enables the signal amplification function in or before the subframe 0 of each radio frame based on the control signaling 5.

S1003c: The second device performs signal amplification on the MIB in the subframe 0 of each radio frame, and sends the MIB obtained through signal amplification to the first remote terminal device. Correspondingly, the first remote terminal device receives, from the second device, the MIB obtained through signal amplification.

S1004c: The first device sends control signaling 6 to the second device in or after the subframe 0 of each radio frame. Correspondingly, the second device receives the control signaling 6 from the first device in or after the subframe 0 of each radio frame, where the control signaling 6 is used to disable the signal amplification function of the second device.

S1005c: The second device disables the signal amplification function in or after the subframe 0 of each radio frame based on the control signaling 6.

It should be noted that, in these embodiments of this application, a sending time point of the control signaling 6 is later than a sending time point of the control signaling 5. For example, if the first device sends the control signaling 5 to the second device in the subframe 0 of each radio frame, the first device sends the control signaling 6 to the second device after the subframe 0 of each radio frame. Alternatively, if the first device sends the control signaling 5 to the second device before the subframe 0 of each radio frame, the first device sends the control signaling 6 to the second device in or after the subframe 0 of each radio frame. Unified descriptions are provided herein, and details are not described below again.

It should be noted that because the narrowband primary synchronization signal (NPSS), the narrowband secondary synchronization signal (NSSS), and the MIB are all sent cyclically, there is no necessary execution sequence among part 1, part 2, and part 3 in these embodiments of this application. Any one of part 1, part 2, and part 3 may be performed first, and then the remaining two parts are performed sequentially or simultaneously; or any two of part 1, part 2, and part 3 may be performed simultaneously, and then the remaining part may be performed; or the three parts may be performed simultaneously. This is not specifically limited to these embodiments of this application.

Figure 10B:
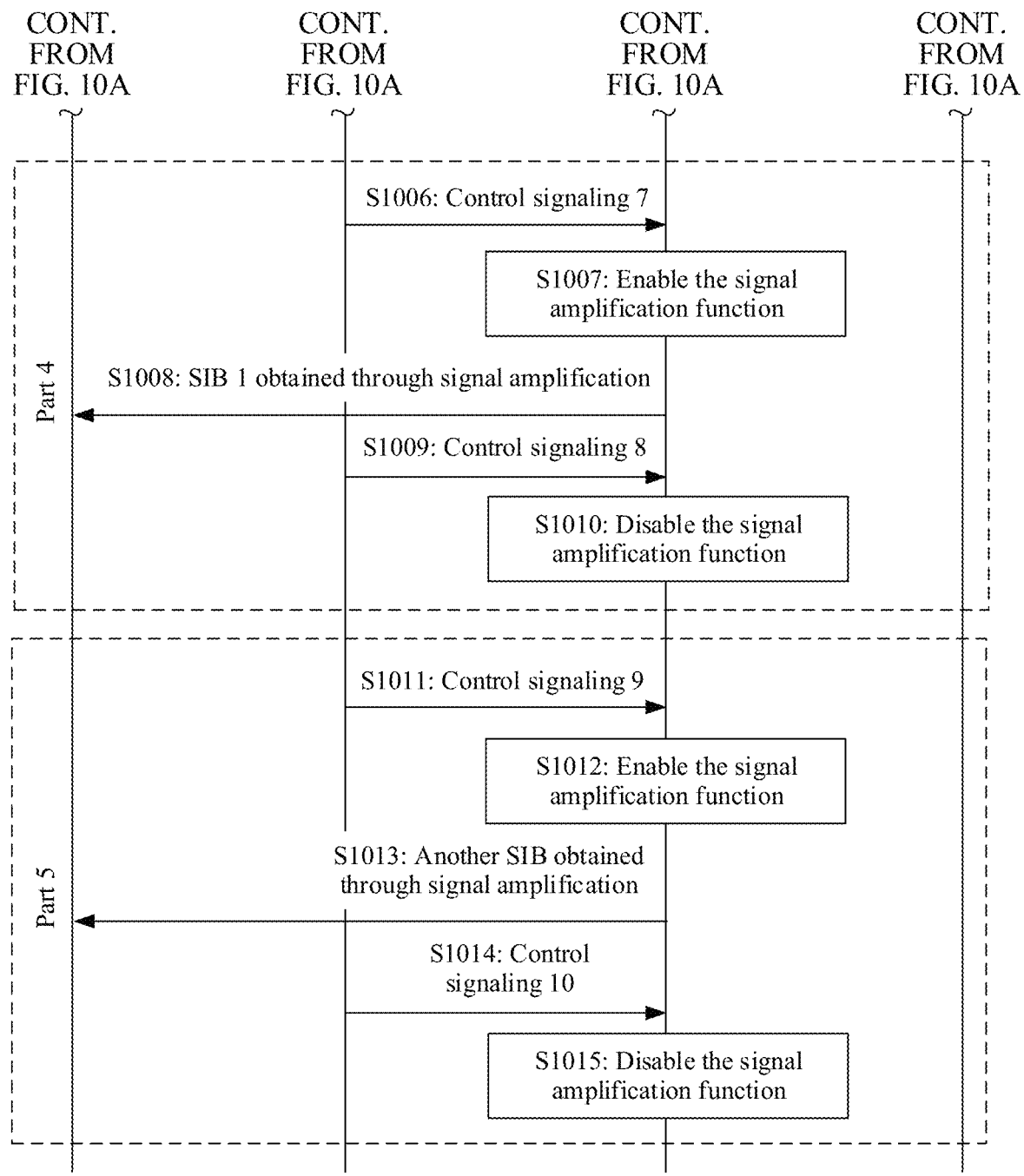

Part 4 in FIG. 10B shows a procedure for processing a SIB 1, and includes the following steps.

S1006: After receiving the MIB, the first device determines, based on scheduling information that is of the SIB 1 and that is included in the MIB, a position of a radio frame for sending a SIB 1, and further sends control signaling 7 to the second device in or before a subframe 4 of the radio frame. Correspondingly, the second device receives the control signaling 7 from the first device in or before the subframe 4 of the radio frame, where the control signaling 7 is used to enable the signal amplification function of the second device.

In embodiments of this application, the MIB includes the scheduling information of the SIB 1, and is used to indicate a transport block size (TBS) and a quantity of repetitions of the SIB 1, and a scheduling periodicity of the SIB 1 is fixed to 2560 ms. The position of the radio frame for sending the SIB 1 can be determined based on the periodicity, the TBS, and the quantity of repetitions of the SIB 1.

S1007: The second device enables the signal amplification function in or before the subframe 4 of the radio frame based on the control signaling 7.

S1008: The second device performs signal amplification on the SIB 1 in the subframe 4 of the radio frame, and sends the SIB 1 obtained through signal amplification to the first remote terminal device. Correspondingly, the first remote terminal device receives, from the second device, the SIB 1 obtained through signal amplification.

S1009: The first device sends control signaling 8 to the second device in or after the subframe 4 of the radio frame. Correspondingly, the second device receives the control signaling 8 from the first device in or after the subframe 4 of the radio frame, where the control signaling 8 is used to disable the signal amplification function of the second device.

S1010: The second device disables the signal amplification function in or after the subframe 4 of the radio frame based on the control signaling 8.

It should be noted that, in these embodiments of this application, a sending time point of the control signaling 8 is later than a sending time point of the control signaling 7. For example, if the first device sends the control signaling 7 to the second device in the subframe 4 of the radio frame, the first device sends the control signaling 8 to the second device after the subframe 4 of the radio frame. Alternatively, if the first device sends the control signaling 7 to the second device before the subframe 4 of the radio frame, the first device sends the control signaling 8 to the second device in or after the subframe 4 of the radio frame. Unified descriptions are provided herein, and details are not described below again.

Part 5 in FIG. 10B shows a procedure for processing another SIB and includes the following steps.

S1011: After receiving the SIB 1, the first device determines, based on scheduling information that is of the other SIB and that is included in the SIB 1, a position of a time domain resource for transmitting the other SIB, and then sends control signaling 9 to the second device at or before a start position of the time domain resource for transmitting the other SIB. Correspondingly, the second device receives the control signaling 9 from the first device at or before the start position of the time domain resource for transmitting the other SIB, where the control signaling 9 is used to enable the signal amplification function of the second device.

S1012: The second device enables, based on the control signaling 9, the signal amplification function at or before the start position of the time domain resource for transmitting the other SIB.

S1013: The second device performs signal amplification on the other SIB at the position of the time domain resource for transmitting the other SIB, and sends the other SIB obtained through signal amplification to the first remote terminal device. Correspondingly, the first remote terminal device receives, from the second device, the other SIB obtained through signal amplification.

S1014: The first device sends control signaling 10 to the second device at or after an end position of the time domain resource for transmitting the other SIB. Correspondingly, the second device receives the control signaling 10 from the first device at or after the end position of the time domain resource for transmitting the other SIB, where the control signaling 10 is used to disable the signal amplification function of the second device.

S1015: The second device disables, based on the control signaling 10, the signal amplification function at or after the end position of the time domain resource for transmitting the other SIB.

It should be noted that, in these embodiments of this application, if the time domain resource for transmitting the other SIB occupies one subframe, it may be considered that both the end position of the time domain resource for transmitting the other SIB and the start position of the time domain resource for transmitting the other SIB are positions of the subframe. In this case, a sending time point of the control signaling 10 is later than a sending time point of the control signaling 9. For example, if the first device sends the control signaling 9 to the second device in the subframe, the first device sends the control signaling 10 to the second device after the subframe. Alternatively, if the first device sends the control signaling 9 to the second device before the subframe, the first device sends the control signaling 10 to the second device in or after the subframe. Unified descriptions are provided herein, and details are not described below again.

It should be noted that, in these embodiments of this application, the SIB 1 may include scheduling information of a plurality of other SIBs. In this case, steps S1011 to S1015 are performed for each of the other SIBs. Unified descriptions are provided herein, and details are not described below again.

It should be noted that, in these embodiments of this application, after completing the procedure for processing the SIB 1 or the procedure for processing the other SIB, the first device may further continue to perform the NPSS procedure, the NSSS procedure, or the MIB procedure. Unified descriptions are provided herein, and details are not described below again.

Figure 11A:
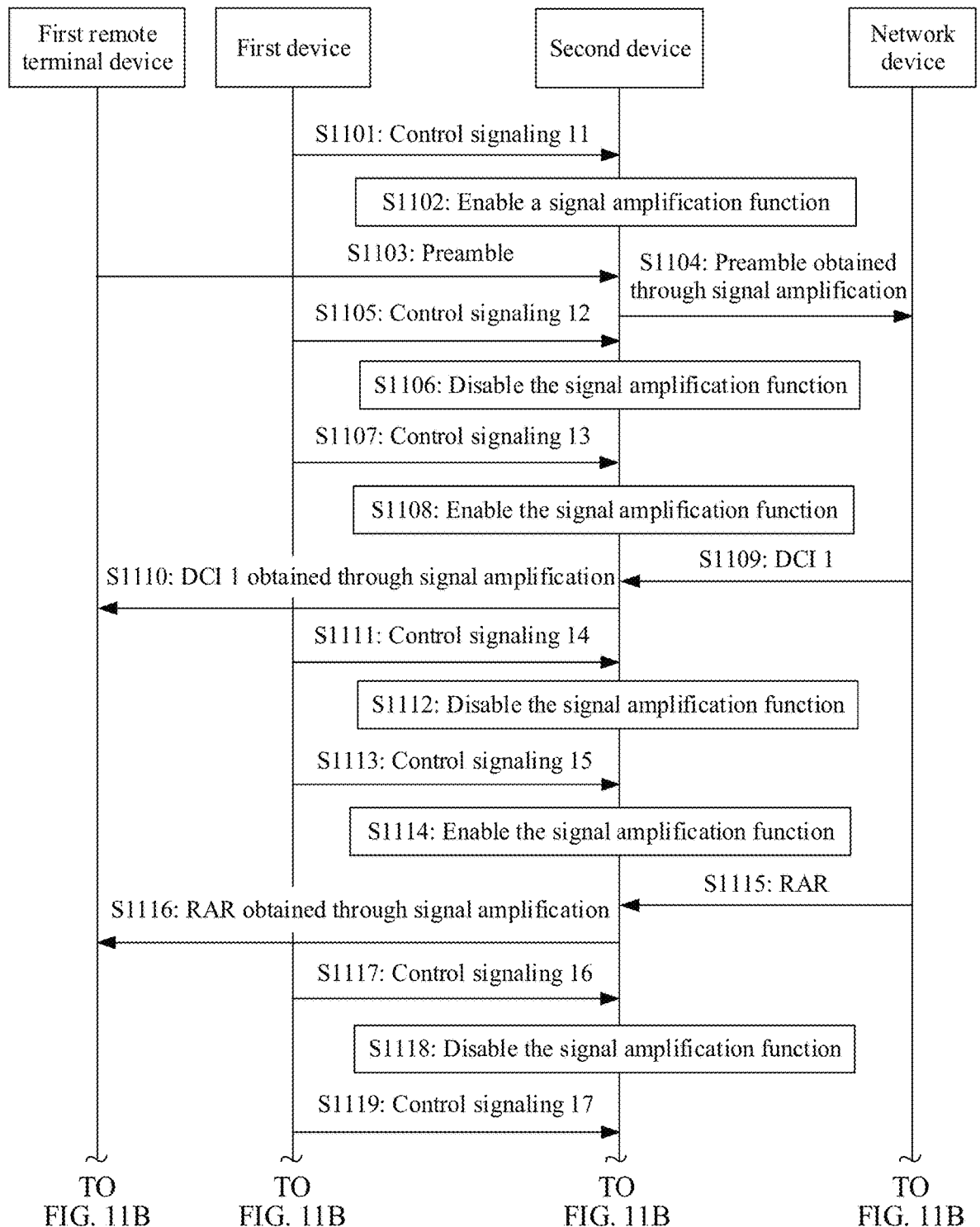
FIG. 11A and FIG. 11B are a schematic flowchart of another signal processing method according to an embodiment of this application.
Figure 11B:
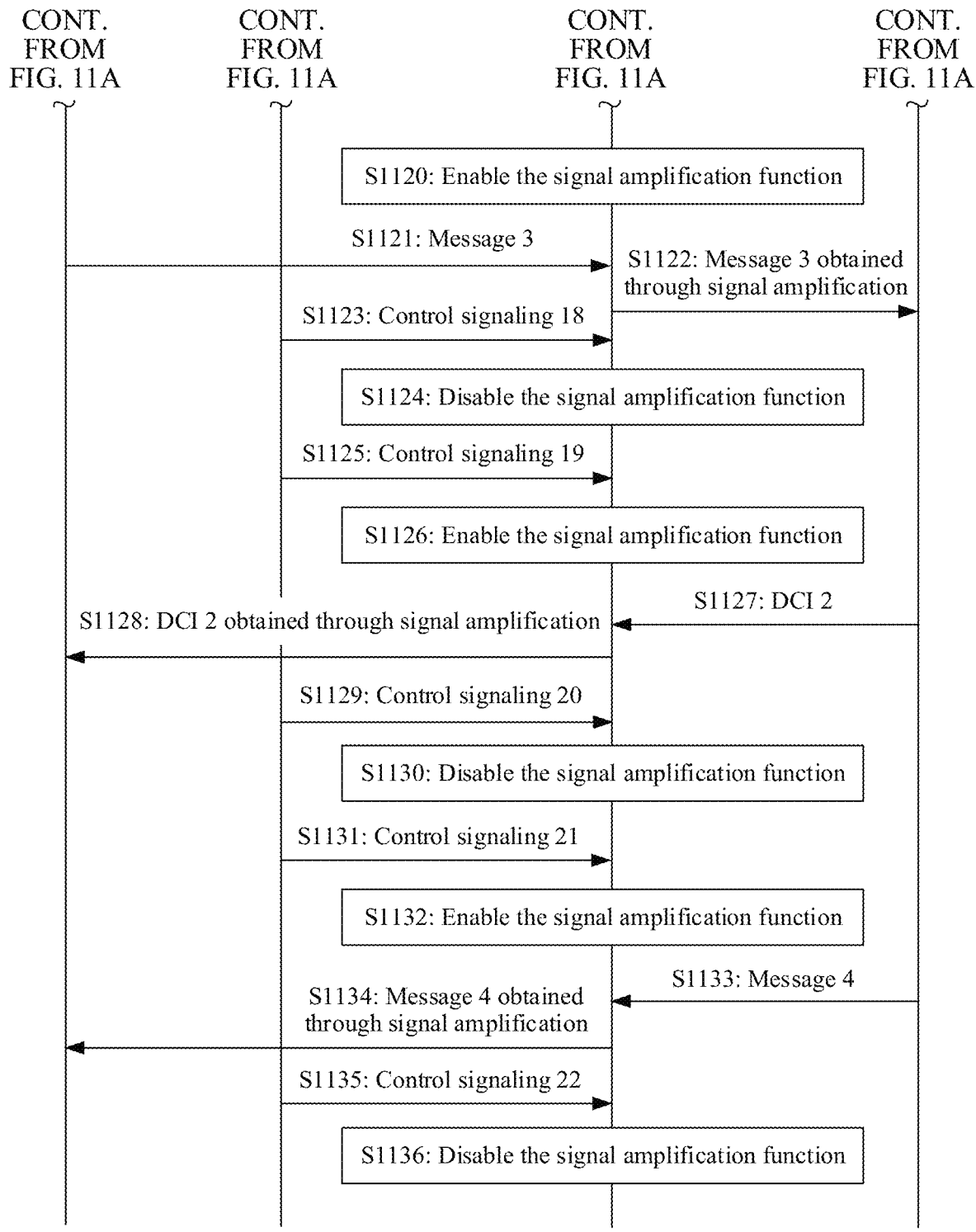

After the foregoing signal processing procedure ends, the terminal device may initiate a random access procedure. The following provides a signal processing method in the random access procedure. As shown in FIG. 11A and FIG. 11B, the method includes the following steps.

S1101: After receiving a first SIB, the first device sends, based on information that indicates a time domain position of a narrowband physical random access control (NPRACH) resource and that is included in the first SIB, control signaling 11 to the second device at or before a start time domain position of the NPRACH resource. Correspondingly, the second device receives the control signaling 11 from the first device at or before the start time domain position of the NPRACH resource, where the control signaling 11 is used to enable the signal amplification function of the second device.

Optionally, the first SIB herein may be, for example, a SIB 2, a SIB 22, or a SIB 23.

S1102: The second device enables, based on the control signaling 11, the signal amplification function at or before the start time domain position of the NPRACH resource.

S1103: The first remote terminal device sends, to the second device, a preamble carried on the NPRACH resource. Correspondingly, the second device receives, from the first remote terminal device, the preamble carried on the NPRACH resource.

S1104: The second device amplifies the preamble at the position of the NPRACH resource, and sends the preamble obtained through signal amplification to the network device. Correspondingly, the network device receives the amplified preamble from the second device.

It should be noted that although not shown, in these embodiments of this application, the first device may alternatively detect the preamble from the first remote terminal device, and parse the preamble to obtain a first random access (RA)-RNTI. Unified descriptions are provided herein, and details are not described below again.

S1105: The first device sends control signaling 12 to the second device at or after an end time domain position of the NPRACH resource. Correspondingly, the second device receives the control signaling 12 from the first device at or after the end time domain position of the NPRACH resource, where the control signaling 12 is used to disable the signal amplification function of the second device.

S1106: The second device disables, based on the control signaling 12, the signal amplification function at or after the end time domain position of the NPRACH resource.

S1107: After detecting the preamble carried on the NPRACH resource, the first device sends, based on information that indicates a time domain position of an NPDCCH resource 1 and that is included in a second SIB, control signaling 13 to the second device at or before a start time domain position of the NPDCCH resource 1. Correspondingly, the second device receives the control signaling 13 from the first device at or before the start time domain position of the NPDCCH resource 1, where the control signaling 13 is used to enable the signal amplification function of the second device.

In these embodiments of this application, the information that indicates the time domain position of the NPDCCH resource 1 may be information about a specific time window. A size of the specific time window is coverage-related, and is indicated by the second SIB. The size of the specific time window is a multiple of {2, 3, 4, 5, 6, 7, 8, 10} *NPDCCH search space periodicity, but cannot exceed 10.24 s.

Optionally, the second SIB herein may be, for example, the SIB 2, the SIB 22, or the SIB 23.

S1108: The second device enables, based on the control signaling 13, the signal amplification function at or before the start time domain position of the NPDCCH resource 1.

S1109: After receiving the preamble, the network device sends, to the second device in the specific time window, DCI 1 carried on the NPDCCH resource 1, where the DCI 1 is used to schedule a RAR (which may also be referred to as a message 2 (message, Msg2)). Correspondingly, the second device receives, from the network device, the DCI 1 carried on the NPDCCH resource 1.

It should be noted that although not shown, in these embodiments of this application, the first device may alternatively descramble (which may also be referred to as parse), by using the first RA-RNTI on the NPDCCH resource 1 for scheduling the RAR in the specific time window, the DCI 1 for scheduling the RAR, to obtain scheduling information of the RAR, for example, a quantity of repetitions of the RAR. Unified descriptions are provided herein, and details are not described below again.

In addition, it should be noted that the first RA-RNTI in these embodiments of this application may also be referred to as a first radio network temporary identifier. In other words, the first device parses, by using the first radio network temporary identifier, the DCI 1 for scheduling the RAR. The first radio network temporary identifier is a radio network identifier used by the first remote terminal device to parse the DCI 1 for scheduling the RAR. In other words, the first remote terminal device descrambles, by using the first RA-RNTI, the DCI 1 for scheduling the RAR. Unified descriptions are provided herein, and details are not described below again.

S1110: The second device amplifies the DCI 1 at the position of the NPDCCH resource 1, and sends the DCI 1 obtained through signal amplification to the first remote terminal device. Correspondingly, the first remote terminal device receives the amplified DCI 1 from the second device.

S1111: The first device sends control signaling 14 to the second device at or after an end time domain position of the NPDCCH resource 1. Correspondingly, the second device receives the control signaling 14 from the first device at or after the end time domain position of the NPDCCH resource 1, where the control signaling 14 is used to disable the signal amplification function of the second device.

S1112: The second device disables, based on the control signaling 14, the signal amplification function at or after the end time domain position of the NPDCCH resource 1.

S1113: The first device sends, based on the obtained scheduling information of the RAR, control signaling 15 to the second device at or before a start position of a position of a time domain resource for transmitting the RAR. Correspondingly, the second device receives the control signaling 15 from the first device at or before the start position of the position of the time domain resource for transmitting the RAR, where the control signaling 15 is used to enable the signal amplification function of the second device.

S1114: The second device enables, based on the control signaling 15, the signal amplification function at or before the start position of the position of the time domain resource for transmitting the RAR.

S1115: The network device sends the RAR to the second device. Correspondingly, the second device receives the RAR from the network device.

S1116: The second device amplifies the RAR at the position of the time domain resource for transmitting the RAR, and sends the RAR obtained through signal amplification to the first remote terminal device. Correspondingly, the first remote terminal device receives the amplified RAR from the second device.

It should be noted that although not shown, in these embodiments of this application, the first device may alternatively detect the RAR from the network device, and parse the RAR to obtain a first temporal cell (TC)-RNTI and scheduling information of a message 3 (msg3) that are allocated by the network device to the first remote terminal device. Unified descriptions are provided herein, and details are not described below again.

S1117: The first device sends control signaling 16 to the second device at or after an end position of the position of the time domain resource for transmitting the RAR. Correspondingly, the second device receives the control signaling 16 from the first device at or after the end position of the position of the time domain resource for transmitting the RAR, where the control signaling 16 is used to disable the signal amplification function of the second device.

S1118: The second device disables, based on the control signaling 16, the signal amplification function at or after the end position of the position of the time domain resource for transmitting the RAR.

S1119: The first device sends, based on the obtained scheduling information of the message 3, control signaling 17 to the second device at or before a start position of a position of a time domain resource for transmitting the message 3. Correspondingly, the second device receives the control signaling 17 from the first device at or before the start position of the position of the time domain resource for transmitting the message 3, where the control signaling 17 is used to enable the signal amplification function of the second device.

S1120: The second device enables, based on the control signaling 17, the signal amplification function at or before the start position of the position of the time domain resource for transmitting the message 3.

S1121: The first remote terminal device sends the message 3 to the second device. Correspondingly, the second device receives the message 3 from the first remote terminal device.

In these embodiments of this application, the message 3 carries information such as a terminal identifier of the first remote terminal device and a reason for triggering sending of the message 3.

S1122: The second device amplifies the message 3 at the position of the time domain resource for transmitting the message 3, and sends the message 3 obtained through signal amplification to the network device. Correspondingly, the network device receives the amplified message 3 from the second device.

S1123: The first device sends control signaling 18 to the second device at or after an end position of the position of the time domain resource for transmitting the message 3. Correspondingly, the second device receives the control signaling 18 from the first device at or after the end position of the position of the time domain resource for transmitting the message 3, where the control signaling 18 is used to disable the signal amplification function of the second device.

S1124: The second device disables, based on the control signaling 18, the signal amplification function at or after the end position of the position of the time domain resource for transmitting the message 3.

S1125: The first device sends, based on information that indicates a time domain position of an NPDCCH resource 2 and that is included in a third SIB, control signaling 19 to the second device at or before a start time domain position of the NPDCCH resource 2. Correspondingly, the second device receives the control signaling 19 from the first device at or before the start time domain position of the NPDCCH resource 2, where the control signaling 19 is used to enable the signal amplification function of the second device.

Optionally, the third SIB herein may be, for example, the SIB 2, an SIB 20, or the SIB 22.

It should be noted that, in these embodiments of this application, the information that indicates the time domain position of the NPDCCH resource 2 may be the same as the information that indicates the time domain position of the NPDCCH resource 1. This is not specifically limited in the embodiments of this application.

S1126: The second device enables, based on the control signaling 19, the signal amplification function at or before the start time domain position of the NPDCCH resource 2.

S1127: After receiving the message 3, the network device sends, to the second device, DCI 2 carried on the NPDCCH resource 2, where the DCI 2 is used to schedule a message 4. Correspondingly, the second device receives, from the network device, the DCI 2 carried on the NPDCCH resource 2.

It should be noted that although not shown, in these embodiments of this application, the first device may alternatively descramble, on the NPDCCH resource 2 by using the first TC-RNTI, the DCI 2 for scheduling the message 4, to obtain scheduling information of the message 4, for example, a quantity of repetitions of the message 4. Unified descriptions are provided herein, and details are not described below again.

In addition, it should be noted that the first TC-RNTI in these embodiments of this application may also be referred to as the first radio network temporary identifier. In other words, the first device parses, by using the first radio network temporary identifier, the DCI 2 for scheduling the message 4. The first radio network temporary identifier is a radio network identifier used by the first remote terminal device to parse the DCI 2 for scheduling the message 4. In other words, the first remote terminal device descrambles, by using the first TC-RNTI, the DCI 2 for scheduling the message 4. Unified descriptions are provided herein, and details are not described below again.

S1128: The second device amplifies the DCI 2 at the position of the NPDCCH resource 2, and sends the DCI 2 obtained through signal amplification to the first remote terminal device. Correspondingly, the first remote terminal device receives the amplified DCI 2 from the second device.

S1129: The first device sends control signaling 20 to the second device at or after an end time domain position of the NPDCCH resource 2. Correspondingly, the second device receives the control signaling 20 from the first device at or after the end time domain position of the NPDCCH resource 2, where the control signaling 20 is used to disable the signal amplification function of the second device.

S1130: The second device disables, based on the control signaling 20, the signal amplification function at or after the end time domain position of the NPDCCH resource 2.

S1131: The first device sends, based on the obtained scheduling information of the message 4, control signaling 21 to the second device at or before a start position of a position of a time domain resource for transmitting the message 4. Correspondingly, the second device receives the control signaling 21 from the first device at or before the start position of the position of the time domain resource for transmitting the message 4, where the control signaling 21 is used to enable the signal amplification function of the second device.

S1132: The second device enables, based on the control signaling 21, the signal amplification function at or before the start position of the position of the time domain resource for transmitting the message 4.

S1133: The network device sends the message 4 to the second device. Correspondingly, the second device receives the message 4 from the network device.

S1134: The second device amplifies the message 4 at the position of the time domain resource for transmitting the message 4, and sends the message 4 obtained through signal amplification to the first remote terminal device. Correspondingly, the first remote terminal device receives the amplified message 4 from the second device.

It should be noted that although not shown, in these embodiments of this application, the first device may alternatively descramble, by using the first TC-RNTI, an NPDSCH carrying the message 4 and parse the message 4 to obtain a first C-RNTI of the first remote terminal device, so that the first TC-RNTI can be subsequently upgraded to the first C-RNTI. Unified descriptions are provided herein, and details are not described below again.

In addition, it should be noted that the first TC-RNTI in these embodiments of this application may also be referred to as the first radio network temporary identifier. In other words, the first device parses, by using the first radio network temporary identifier, the NPDSCH carrying the message 4. The first radio network temporary identifier is a radio network identifier used by the first remote terminal device to parse the NPDSCH carrying the message 4. In other words, the first remote terminal device descrambles, by using the first TC-RNTI, the NPDSCH carrying the message 4. Unified descriptions are provided herein, and details are not described below again.

S1135: The first device sends control signaling 22 to the second device at or after an end position of the position of the time domain resource for transmitting the message 4. Correspondingly, the second device receives the control signaling 22 from the first device at or after the end position of the position of the time domain resource for transmitting the message 4, where the control signaling 22 is used to disable the signal amplification function of the second device.

S1136: The second device disables, based on the control signaling 22, the signal amplification function at or after the end position of the position of the time domain resource for transmitting the message 4.

It should be noted that the RAR or the message 4 in these embodiments of this application may be understood as downlink data carried on the NPDSCH. The message 3 in these embodiments of this application may be understood as uplink data carried on an NPUSCH. Unified descriptions are provided herein, and details are not described below again.

In this case, the random access process provided in these embodiments of this application ends.

It should be noted that in the embodiment shown in FIG. 11A and FIG. 11B, steps S1105 to S1108, steps S1111 to S1114, steps S1117 to S1120, steps S1123 to S1126, and steps S1129 to S1132 may be optional steps. That is, the signal amplification function is enabled in the entire random access process, and the signal amplification function is disabled when the random access process ends. This case is not specifically limited in the embodiments of this application.

Figure 12A:
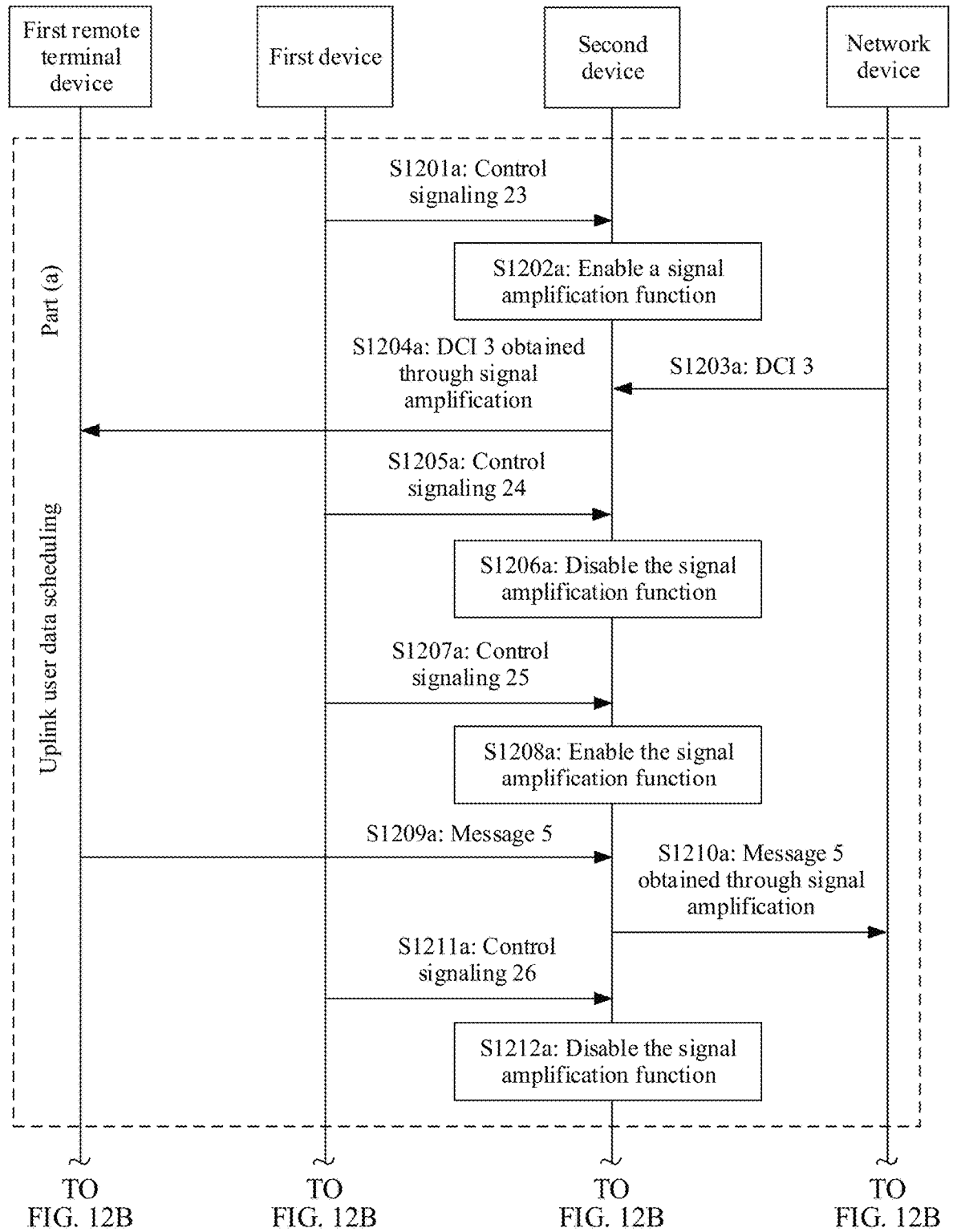
FIG. 12A and FIG. 12B are a schematic flowchart of still another signal processing method according to an embodiment of this application.

After the foregoing random access procedure ends, uplink or downlink data may be scheduled. The following provides a signal processing method in an uplink or downlink data scheduling procedure. The signal processing method in the uplink data scheduling procedure shown in part (a) in FIG. 12A includes the following steps.

S1201a: The first device learns of, based on configuration information that is of a first terminal-specific search space (UE-specific search space, USS) and that is carried in the message 4 in the random access procedure, information that indicates a time domain position of an NPDCCH resource 3 that carries DCI 3 for scheduling a message 5, and then sends control signaling 23 to the second device at or before a start time domain position of the NPDCCH resource 3. Correspondingly, the second device receives the control signaling 23 from the first device at or before the start time domain position of the NPDCCH resource 3, where the control signaling 23 is used to enable the signal amplification function of the second device.

S1202a: The second device enables, based on the control signaling 23, the signal amplification function at or before the start time domain position of the NPDCCH resource 3.

S1203a: The network device sends, to the second device, the DCI 3 carried on the NPDCCH resource 3, where the DCI 3 is used to schedule the message 5. Correspondingly, the second device receives, from the network device, the DCI 3 carried on the NPDCCH resource 3.

It should be noted that although not shown, in these embodiments of this application, the first device may alternatively descramble, on the NPDCCH resource 3 by using the first C-RNTI, the DCI 3 for scheduling the message 5, to obtain scheduling information of the message 5, for example, a quantity of repetitions of the message 5. Unified descriptions are provided herein, and details are not described below again.

In addition, it should be noted that the first C-RNTI in these embodiments of this application may also be referred to as the first radio network temporary identifier. In other words, the first device parses, by using the first radio network temporary identifier, the DCI 3 for scheduling the message 5. The first radio network temporary identifier is a radio network identifier used by the first remote terminal device to parse the DCI 3 for scheduling the message 5. In other words, the first remote terminal device descrambles, by using the first C-RNTI, the DCI 3 for scheduling the message 5. Unified descriptions are provided herein, and details are not described below again.

S1204a: The second device amplifies the DCI 3 at the position of the NPDCCH resource 3, and sends the DCI 3 obtained through signal amplification to the first remote terminal device. Correspondingly, the first remote terminal device receives the amplified DCI 3 from the second device.

S1205a: The first device sends control signaling 24 to the second device at or after an end time domain position of the NPDCCH resource 3. Correspondingly, the second device receives the control signaling 24 from the first device at or after the end time domain position of the NPDCCH resource 3, where the control signaling 24 is used to disable the signal amplification function of the second device.

S1206a: The second device disables, based on the control signaling 24, the signal amplification function at or after the end time domain position of the NPDCCH resource 3.

S1207a: The first device sends, based on the obtained scheduling information of the message 5, control signaling 25 to the second device at or before a start position of a position of a time domain resource for transmitting the message 5. Correspondingly, the second device receives the control signaling 25 from the first device at or before the start position of the position of the time domain resource for transmitting the message 5, where the control signaling 25 is used to enable the signal amplification function of the second device.

S1208a: The second device enables, based on the control signaling 25, the signal amplification function at or before the start position of the position of the time domain resource for transmitting the message 5.

S1209a: The first remote terminal device sends the message 5 to the second device. Correspondingly, the second device receives the message 5 from the first remote terminal device.

S1210a: The second device amplifies the message 5 at the position of the time domain resource for transmitting the message 5, and sends the message 5 obtained through signal amplification to the network device. Correspondingly, the network device receives the amplified message 5 from the second device.

S1211a: The first device sends control signaling 26 to the second device at or after an end position of the position of the time domain resource for transmitting the message 5. Correspondingly, the second device receives the control signaling 26 from the first device at or after the end position of the position of the time domain resource for transmitting the message 5, where the control signaling 26 is used to disable the signal amplification function of the second device.

S1212a: The second device disables, based on the control signaling 26, the signal amplification function at or after the end position of the position of the time domain resource for transmitting the message 5.

It should be noted that the message 5 in these embodiments of this application may also be understood as uplink data carried on the NPUSCH. Unified descriptions are provided herein, and details are not described below again.

In this case, the uplink data scheduling procedure ends.

Figure 12B:
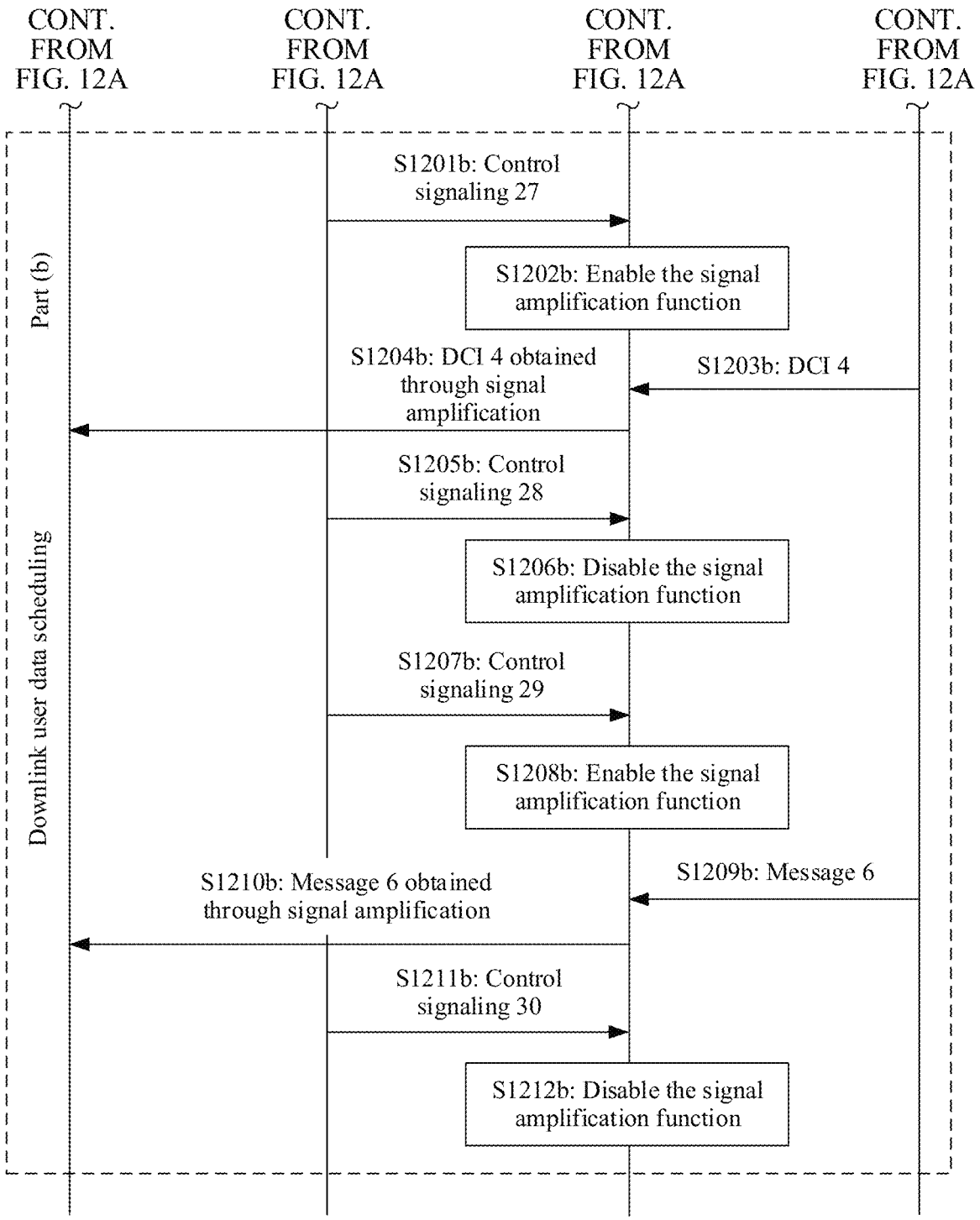

The signal processing method in the downlink data scheduling procedure shown in part (b) in FIG. 12B includes the following steps.

S1201b: The first device learns of, based on configuration information that is of a first USS and that is carried in the message 4, information that indicates a time domain position of an NPDCCH resource 4 that carries DCI 4 for scheduling a message 6, and then sends control signaling 27 to the second device at or before a start time domain position of the NPDCCH resource 4. Correspondingly, the second device receives the control signaling 27 from the first device at or before the start time domain position of the NPDCCH resource 4, where the control signaling 27 is used to enable the signal amplification function of the second device.

S1202b: The second device enables, based on the control signaling 27, the signal amplification function at or before the start time domain position of the NPDCCH resource 4.

S1203b: The network device sends, to the second device, the DCI 4 carried on the NPDCCH resource 4, where the DCI 4 is used to schedule the message 6. Correspondingly, the second device receives, from the network device, the DCI 4 carried on the NPDCCH resource 4.

It should be noted that although not shown, in these embodiments of this application, the first device may alternatively descramble, on the NPDCCH resource 4 by using the first C-RNTI, the DCI 4 for scheduling the message 6, to obtain scheduling information of the message 6, for example, a quantity of repetitions of the message 6. Unified descriptions are provided herein, and details are not described below again.

In addition, it should be noted that the first C-RNTI in these embodiments of this application may also be referred to as the first radio network temporary identifier. In other words, the first device parses, by using the first radio network temporary identifier, the DCI 4 for scheduling the message 6. The first radio network temporary identifier is a radio network identifier used by the first remote terminal device to parse the DCI 4 for scheduling the message 6. In other words, the first remote terminal device descrambles, by using the first C-RNTI, the DCI 4 for scheduling the message 6. Unified descriptions are provided herein, and details are not described below again.

S1204*b*: The second device amplifies the DCI 4 at the position of the NPDCCH resource 4, and sends the DCI 4 obtained through signal amplification to the first remote terminal device. Correspondingly, the first remote terminal device receives the amplified DCI 4 from the second device.

S1205*b*: The first device sends control signaling 28 to the second device at or after an end time domain position of the NPDCCH resource 4. Correspondingly, the second device receives the control signaling 28 from the first device at or after the end time domain position of the NPDCCH resource 4, where the control signaling 28 is used to disable the signal amplification function of the second device.

S1206*b*: The second device disables, based on the control signaling 28, the signal amplification function at or after the end time domain position of the NPDCCH resource 4.

S1207*b*: The first device sends, based on the obtained scheduling information of the message 6, control signaling 29 to the second device at or before a start position of a position of a time domain resource for transmitting the message 6. Correspondingly, the second device receives the control signaling 29 from the first device at or before the start position of the position of the time domain resource for transmitting the message 6, where the control signaling 29 is used to enable the signal amplification function of the second device.

S1208*b*: The second device enables, based on the control signaling 29, the signal amplification function at or before the start position of the position of the time domain resource for transmitting the message 6.

S1209*b*: The network device sends the message 6 to the second device. Correspondingly, the second device receives the message 6 from the network device.

S1210*b*: The second device amplifies the message 6 at the position of the time domain resource for transmitting the message 6, and sends the message 6 obtained through signal amplification to the first remote terminal device. Correspondingly, the first remote terminal device receives the amplified message 6 from the second device.

S1211*b*: The first device sends control signaling 30 to the second device at or after an end position of the position of the time domain resource for transmitting the message 6. Correspondingly, the second device receives the control signaling 30 from the first device at or after the end position of the position of the time domain resource for transmitting the message 6, where the control signaling 30 is used to disable the signal amplification function of the second device.

S1212*b*: The second device disables, based on the control signaling 30, the signal amplification function at or after the end position of the position of the time domain resource for transmitting the message 6.

It should be noted that the message 6 in these embodiments of this application may also be understood as downlink data carried on the NPDSCH. Unified descriptions are provided herein, and details are not described below again.

In this case, the downlink data scheduling procedure ends.

Optionally, in these embodiments of this application, the random access process, the downlink data processing process, and the uplink data processing process that are described above are all described for the network device and one remote terminal device. Actually, the network device may interact with a plurality of remote terminal devices. In this case, the first device may prestore a mapping relationship between a radio network temporary identifier and a USS or a CSS, and the mapping relationship includes a mapping relationship between the first radio network temporary identifier and the first USS or a first CSS. The first radio network temporary identifier herein may be the first C-RNTI, the first RA-RNTI, or the first TC-RNTI. That the first device determines the first radio network temporary identifier may include: The first device determines the first USS or the first CSS corresponding to a second time domain resource position for transmitting a second signal; and the first device determines the first radio network temporary identifier based on the first USS or the first CSS and the prestored mapping relationship between the first radio network temporary identifier and the first USS or the first CSS. For example, the second signal is DCI x carried on an NPDCCH resource x. In this case, that the first device determines the first C-RNTI may include: The first device determines the first USS corresponding to the NPDCCH resource x carrying the DCI x, and then determines the first C-RNTI based on the first USS and the prestored mapping relationship between the first C-RNTI and the first USS. That the first device determines the first RA-RNTI may include: The first device determines the first CSS corresponding to the NPDCCH resource x carrying the DCI x, and then determines the first RA-RNTI based on the first CSS and the prestored mapping relationship between the first RA-RNTI and the first CSS. That the first device determines the first TC-RNTI may include: The first device determines the first CSS corresponding to the NPDCCH resource x carrying the DCI x, and then determines the first TC-RNTI based on the first CSS and the prestored mapping relationship between the first TC-RNTI and the first CSS.

Optionally, in these embodiments of this application, the mapping relationship that is between the first radio network temporary identifier and the first USS or the first CSS and that is prestored by the first device may be obtained in the following manner: The first USS may be determined based on configuration information that is of the first USS and that is carried in the message 4 in the random access process, and the first CSS may be determined based on the information that indicates the time domain position of the NPDCCH resource 1 and that is included in the second SIB. After the first device determines the first CSS, because the first device has parsed the preamble to obtain the first RA-RNTI, the first device may establish the mapping relationship between the first RA-RNTI and the first CSS. After the first device parses the RAR to obtain the first TC-RNTI allocated by the network device to the first remote terminal device, the first device may establish the mapping relationship between the first TC-RNTI and the first CSS. When the first device determines the first USS, because the first device may further obtain the first C-RNTI of the first remote terminal device by parsing the message 4, the first device may establish the mapping relationship between the first C-RNTI and the first USS. The first USS or the first CSS may be represented by using parameters of an NPDCCH search space in a pre-stored maintenance list: parameters $R_{max}$, G, and $\alpha_{offset}$. Optionally, the mapping relationship that is between the radio network temporary identifier and the USS or the CSS and that is prestored by the first device may be maintained in the following Table 1:

TABLE 1

| Radio network temporary identifier | USS or CSS |
|---|---|
| First radio network temporary identifier | First $R_{max}$, first G, and first $\alpha_{offset}$ |
| Second radio network temporary identifier | Second $R_{max}$, second G, and second $\alpha_{offset}$ |
| ... | ... |

Figure 13:
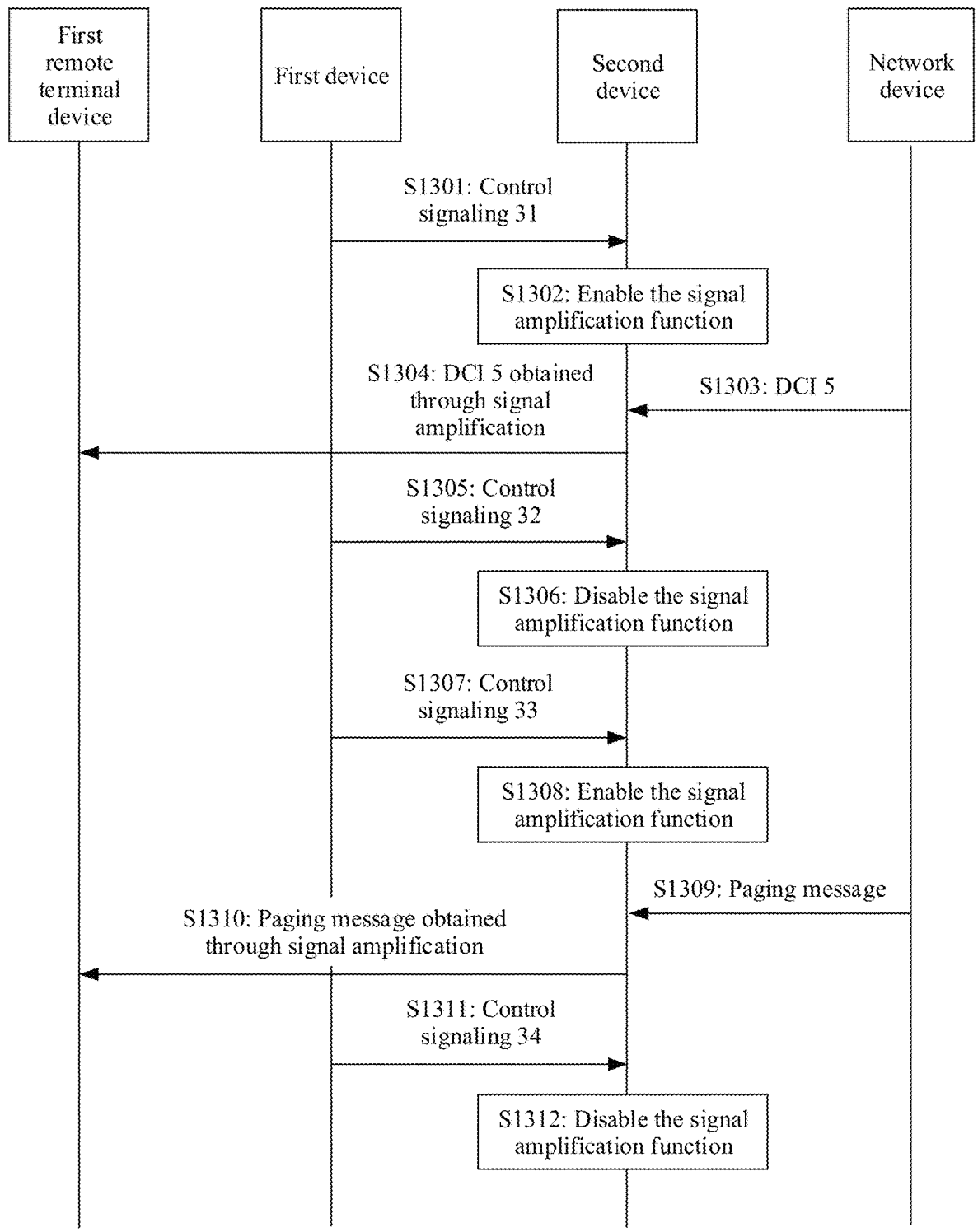
FIG. 13 is a schematic flowchart of still another signal processing method according to an embodiment of this application.

Optionally, in these embodiments of this application, when the first remote terminal device is in an idle mode, the first remote terminal device may detect, in a blind detection manner, a physical downlink control channel in a physical downlink control channel search space in which a position of a PO is a start subframe. This process is referred to as a paging procedure. After paging succeeds, the foregoing random access procedure can be entered. The following provides a signal processing method in the paging procedure. As shown in FIG. 13, the method includes the following steps.

S1301: The first device sends, based on information that indicates a time domain position of an NPDCCH resource 5 and that is included in a fourth SIB, control signaling 31 to the second device at or before a start time domain position of the NPDCCH resource 5. Correspondingly, the second device receives the control signaling 31 from the first device at or before the start time domain position of the NPDCCH resource 5, where the control signaling 31 is used to enable the signal amplification function of the second device.

In these embodiments of this application, the information that indicates the time domain position of the NPDCCH resource 5 may be a size of a DRX cycle, a paging density (to be specific, a quantity of paging opportunities included in one DRX cycle), and a quantity of repetitions of the NPDCCH scrambled by using a paging (P)-RNTI. A position of a PO may be determined based on the paging density and the DRX cycle, and the position of the PO is a start position of the NPDCCH resource 5.

Optionally, the fourth SIB herein may be, for example, the SIB 2.

S1302: The second device enables, based on the control signaling 31, the signal amplification function at or before the start time domain position of the NPDCCH resource 5.

S1303: The network device sends, to the second device, DCI 5 carried on the NPDCCH resource 5, where the DCI 5 is used to schedule a paging message. Correspondingly, the second device receives, from the network device, the DCI 5 carried on the NPDCCH resource 5.

It should be noted that although not shown, in these embodiments of this application, the first device may alternatively descramble, on the NPDCCH resource 5 by using the P-RNTI, the DCI 5 for scheduling the paging message, to obtain scheduling information of the paging message, for example, a quantity of repetitions of the paging message. Unified descriptions are provided herein, and details are not described below again.

In addition, it should be noted that a first P-RNTI in these embodiments of this application may also be referred to as the first radio network temporary identifier. In other words, the first device parses, by using the first radio network temporary identifier, the DCI 5 for scheduling the paging message. The first radio network temporary identifier is a radio network identifier used by the first remote terminal device to parse the DCI 5 for scheduling the paging message. In other words, the first remote terminal device descrambles, by using the first P-RNTI, the DCI 5 for scheduling the paging message. Unified descriptions are provided herein, and details are not described below again.

S1304: The second device amplifies the DCI 5 at the position of the NPDCCH resource 5, and sends the DCI 5 obtained through signal amplification to the first remote terminal device. Correspondingly, the first remote terminal device receives the amplified DCI 5 from the second device.

S1305: The first device sends control signaling 32 to the second device at or after an end time domain position of the NPDCCH resource 5. Correspondingly, the second device receives the control signaling 32 from the first device at or after the end time domain position of the NPDCCH resource 5, where the control signaling 32 is used to disable the signal amplification function of the second device.

S1306: The second device disables, based on the control signaling 32, the signal amplification function at or after the end time domain position of the NPDCCH resource 5.

S1307: The first device sends, based on the obtained scheduling information of the paging message, control signaling 33 to the second device at or before a start position of a position of a time domain resource for transmitting the paging message. Correspondingly, the second device receives the control signaling 33 from the first device at or before the start position of the position of the time domain resource for transmitting the paging message, where the control signaling 33 is used to enable the signal amplification function of the second device.

S1308: The second device enables, based on the control signaling 33, the signal amplification function at or before the start position of the position of the time domain resource for transmitting the paging message.

S1309: The network device sends the paging message to the second device. Correspondingly, the second device receives the paging message from the network device.

S1310: The second device amplifies the paging message at the position of the time domain resource for transmitting the paging message, and sends the paging message obtained through signal amplification to the first remote terminal device. Correspondingly, the first remote terminal device receives the amplified paging message from the second device.

S1311: The first device sends control signaling 34 to the second device at or after an end position of the position of the time domain resource for transmitting the paging message. Correspondingly, the second device receives the control signaling 34 from the first device at or after the end position of the position of the time domain resource for transmitting the paging message, where the control signaling 34 is used to disable the signal amplification function of the second device.

S1312: The second device disables, based on the control signaling 34, the signal amplification function at or after the end position of the position of the time domain resource for transmitting the paging message.

It should be noted that, when the network device does not need to page the remote terminal device, the network device does not send the DCI 5 at the position of the NPDCCH resource 5. In this case, the first device still needs to amplify a resource in which the NPDCCH resource 5 is located. That is, the procedure of S1301 to S1312 includes only S1301, S1302, S1305, and S1306. Unified descriptions are provided herein, and details are not described below again.

Figure 14:
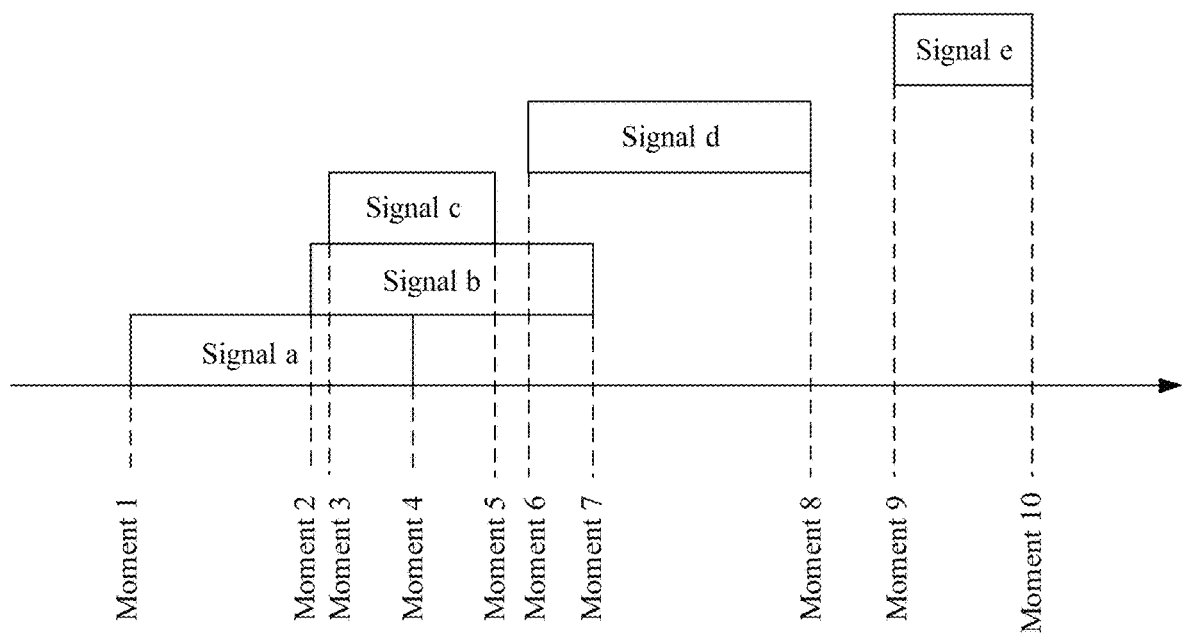
FIG. 14 is an example of a schematic diagram of distribution of time domain resource positions of different signals according to an embodiment of this application.

Optionally, in the embodiments of this application, if time domain resource positions of a plurality of signals overlap (including partial overlap or all overlap), the second device needs to enable the signal amplification function after receiving control signaling that indicates to enable the signal amplification function for the $1^{st}$ signal, and disables the signal amplification function after receiving control signaling that indicates to disable the signal amplification function for the last signal. The $1^{st}$ signal herein is a signal whose start position of a time domain resource position is the foremost, and the last signal herein is a signal whose end position of a time domain resource position is the rearmost. For example, as shown in FIG. 14, it is assumed that a start moment of a time domain resource position corresponding to a signal a is a moment 1, and an end moment of the time domain resource position corresponding to the signal a is a moment 4; a start moment of a time domain resource position corresponding to a signal b is a moment 2, and an end moment of the time domain resource position corresponding to the signal b is a moment 7; a start moment of a time domain resource position corresponding to a signal c is a moment 3, and an end moment of the time domain resource position corresponding to the signal c is a moment 5; a start moment of a time domain resource position corresponding to a signal d is a moment 6, and an end moment of the time domain resource position corresponding to the signal d is a moment 8; and a start moment of a time domain resource position corresponding to a signal e is a moment 9, and an end moment of the time domain resource position corresponding to the signal e is a moment 10. The moments are sorted as follows: the moment 1≤ the moment 2≤ the moment 3≤ the moment 4≤ the moment 5≤ the moment 6≤ the moment 7≤ the moment 8≤ the moment 9≤ the moment 10. The second device needs to enable the signal amplification function after receiving control signaling that indicates to enable the signal amplification function for the signal a (that is, enable the signal amplification function at or before the moment 1), the second device needs to disable the signal amplification function after receiving control signaling that indicates to disable the signal amplification function for the signal d (that is, disable the signal amplification function at or after the moment 8). Unified descriptions are provided herein, and details are not described below again.

To implement the foregoing function, in a possible implementation, after receiving control signaling from the first device, the second device needs to maintain a relationship list. For example, the relationship list may be shown in Table 2, and includes a mapping relationship among control signaling that indicates to enable the signal amplification function, an enabling moment, control signaling that indicates to disable the signal amplification function, and a disabling moment. Therefore, the second device may learn of, based on the mapping relationship, whether time domain positions for transmitting different signals overlap, and if the time domain positions for transmitting the different signals overlap, learn of the control signaling that indicates to enable the signal amplification function for the $1^{st}$ signal and the control signaling that indicates to disable the signal amplification function for the last signal.

TABLE 2

| Enabling moment | Control signaling that indicates to enable the signal amplification function | Disabling moment | Control signaling that indicates to disable the signal amplification function |
|---|---|---|---|
| Moment 1 | Control signaling a1 for the signal a | Moment 4 | Control signaling a2 for the signal a |
| Moment 2 | Control signaling b1 for the signal b | Moment 7 | Control signaling b2 for the signal b |
| Moment 3 | Control signaling c1 for the signal c | Moment 5 | Control signaling c2 for the signal c |
| Moment 6 | Control signaling d1 for the signal d | Moment 8 | Control signaling d2 for the signal d |
| Moment 9 | Control signaling e1 for the signal e | Moment 10 | Control signaling e2 for the signal e |
| ... | ... | ... | ... |

Alternatively, optionally, in the embodiments of this application, after determining time domain resource positions for transmitting signals, the first device may maintain the relationship list shown in Table 2, so that the first device sends, to the second device, control signaling that indicates to enable the signal amplification function for the $1^{st}$ signal, and sends, to the second device, control signaling that indicates to disable the signal amplification function for the last signal. The $1^{st}$ signal herein is a signal whose start position of a time domain resource position is the foremost, and the last signal herein is a signal whose end position of a time domain resource position is the rearmost. For example, as shown in FIG. 14, after determining a time domain resource position for transmitting the signal a, the first device sends, to the second device, the control signaling that indicates to enable the signal amplification function at or before a start position of the time domain resource position (that is, at or before the moment 1). After determining a time domain resource position for transmitting the signal d, the first device sends, to the second device, the control signaling that indicates to disable the signal amplification function at or after an end position of the time domain resource position (that is, at or after the moment 8). In this way, it can be ensured that the signal amplification function is generally enabled from the moment 1 to the moment 8.

Optionally, the first device in the embodiment of this application is in a persistent connection mode, that is, is generally in a connected mode, after being powered on and accessing a network. When system information changes in the network device, the network device directly indicates an RRC message to notify the first device that the system information changes. The RRC message may be a new RRC message. After receiving the RRC message, the first device learns that the system information changes, so that the first device may further re-determine resource positions of paging, random access, reference signals, and the like. Unified descriptions are provided herein, and details are not described below again.

Optionally, in the embodiments of this application, the first device may notify the network device of a C-RNTI of the first device by using an RRC message. The RRC message carries the C-RNTI of the first device. When knowing the C-RNTI of the first device, the network device may communicate with the first device, for example, indicates, by using an RRC message, to the first device that system information changes. Unified descriptions are provided herein, and details are not described below again.

It should be noted that, in the foregoing embodiments of this application, the example in which the first device separately sends, to the second device, the control signaling that indicates to enable the signal amplification function and the control signaling that indicates to disable the signal amplification function is used for description. Certainly, in the embodiments of this application, the first device may also indicate duration of enabling the signal amplification function or a time point of disabling the signal amplification function when indicating the second device to enable the signal amplification function, so that after enabling the signal amplification function, the second device disables the signal amplification function at the time point when the signal amplification function needs to be disabled. This is not specifically limited in the embodiments of this application.

It should be noted that the procedure for processing the NPSS, the procedure for processing the NSS, the procedure for processing the MIB, the procedure for processing the SIB 1, the procedure for processing the other SIB, the random access procedure, the uplink or downlink data scheduling procedure, and the paging procedure in the foregoing embodiments of this application are decoupled from each other and independent of each other. For example, the paging procedure before the random access procedure may alternatively be another paging procedure, or the random access procedure after the paging procedure may alternatively be another random access procedure. This is not specifically limited in the embodiments of this application.

Generally, as a repeater is generally enabled, the repeater amplifies both wanted signals and noise. When a DeNB does not send data to a remote terminal device, amplified noise causes noise interference to the DeNB and another terminal device. According to the signal processing method shown in FIG. 10A, FIG. 10B, FIG. 11A, FIG. 11B, FIG. 12A, FIG. 12B, or FIG. 13 in the embodiments of this application, the first device can indicate, at or before the start position of the first time domain resource position for transmitting the first signal, the second device to enable the signal amplification function. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

The actions of the first device or the second device in the steps in FIG. 10A to FIG. 13 may be performed by the processor 601 in the communication device 600 shown in FIG. 6 by invoking the application program code stored in the memory 603. This is not limited in the embodiments of this application.

Based on the communication system architecture shown in FIG. 5, a signal processing method according to embodiments of this application is provided below by using an NB-IoT system as an example.

Figure 15:
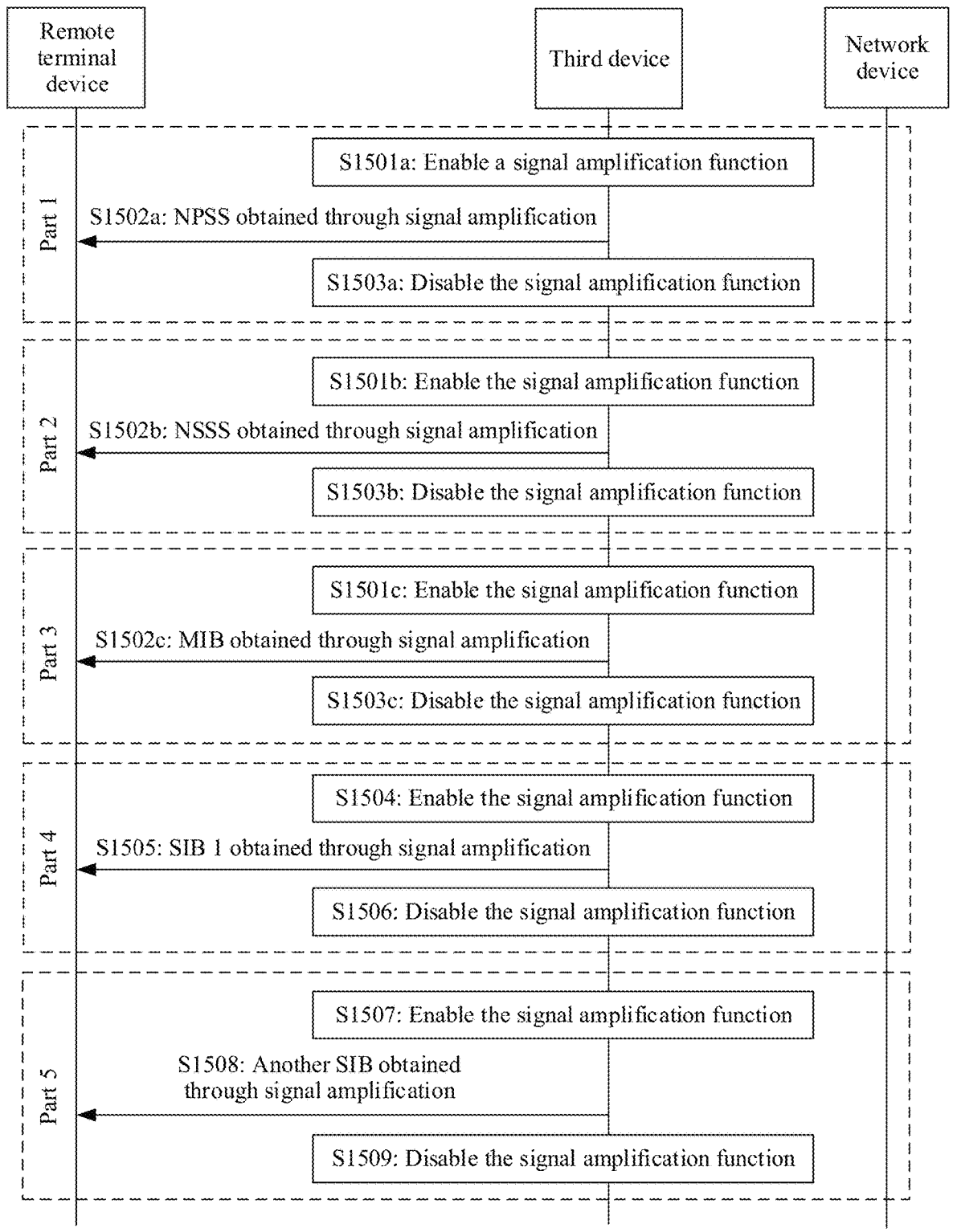
FIG. 15 is a schematic flowchart of still another signal processing method according to an embodiment of this application.

Part 1 in FIG. 15 shows a procedure for processing an NPSS, and includes the following steps.

S1501a: The third device enables the signal amplification function in or before a subframe 5 of each radio frame.

S1502a: The third device performs signal amplification on the NPSS in the subframe 5 of each radio frame, and sends the NPSS obtained through signal amplification to the first remote terminal device. Correspondingly, the first remote terminal device receives, from the third device, the NPSS obtained through signal amplification.

S1503a: The third device disables the signal amplification function in or after the subframe 5 of each radio frame.

Part 2 in FIG. 15 shows a procedure for processing an NSSS, and includes the following steps.

S1501b: The third device enables the signal amplification function in or before a subframe 9 at an interval of one radio frame.

S1502b: The third device performs signal amplification on the NSSS in the subframe 9 at the interval of one radio frame, and sends the NSSS obtained through signal amplification to the first remote terminal device. Correspondingly, the first remote terminal device receives, from the third device, the NSSS obtained through signal amplification.

S1503b: The third device disables the signal amplification function in or after the subframe 9 at the interval of one radio frame.

Part 3 in FIG. 15 shows a procedure for processing an MIB, and includes the following steps.

S1501c: The third device enables the signal amplification function in or before a subframe 0 of each radio frame.

S1502c: The third device performs signal amplification on the MIB in the subframe 0 of each radio frame, and sends the MIB obtained through signal amplification to the first remote terminal device. Correspondingly, the first remote terminal device receives, from the third device, the MIB obtained through signal amplification.

S1503c: The third device disables the signal amplification function in or after the subframe 0 of each radio frame.

It should be noted that because the NPSS, the NSSS, and the MIB are all sent cyclically, there is no necessary execution sequence among part 1, part 2, and part 3 in these embodiments of this application. Any one of part 1, part 2, and part 3 may be performed first, and then the remaining two parts are performed sequentially or simultaneously; or any two of part 1, part 2, and part 3 may be performed simultaneously, and then the remaining part may be performed; or the three parts may be performed simultaneously. This is not specifically limited in these embodiments of this application.

Part 4 in FIG. 15 shows a procedure for processing a SIB 1, and includes the following steps.

S1504: After receiving the MIB, the third device determines, based on scheduling information that is of the SIB 1 and that is included in the MIB, a position of a radio frame for sending the SIB 1, and further enables the signal amplification function in or before a subframe 4 of the radio frame.

In these embodiments of this application, the MIB includes the scheduling information of the SIB 1, and is used to indicate a TBS and a quantity of repetitions of the SIB 1, and a scheduling periodicity of the SIB 1 is fixed to 2560 ms. The position of the radio frame for sending the SIB 1 can be determined based on the periodicity, the TBS, and the quantity of repetitions of the SIB 1.

S1505: The third device performs signal amplification on the SIB 1 in the subframe 4 of the radio frame, and sends the SIB 1 obtained through signal amplification to the first remote terminal device. Correspondingly, the first remote terminal device receives, from the second device, the SIB 1 obtained through signal amplification.

S1506: The third device disables the signal amplification function in or after the subframe 4 of the radio frame.

Part 5 in FIG. 15 shows a procedure for processing another SIB, and includes the following steps.

S1507: After receiving the SIB 1, the third device determines, based on scheduling information that is of the other SIB and that is included in the SIB 1, a position of a time domain resource for transmitting the other SIB, and then enables the signal amplification function at or before a start position of the time domain resource for transmitting the other SIB.

S1508: The third device performs signal amplification on the other SIB at the position of the time domain resource for transmitting the other SIB, and sends the other SIB obtained through signal amplification to the first remote terminal device. Correspondingly, the first remote terminal device receives, from the third device, the other SIB obtained through signal amplification.

S1509: The third device disables the signal amplification function at or after an end position of the time domain resource for transmitting the other SIB.

It should be noted that, in these embodiments of this application, the SIB 1 may include scheduling information of a plurality of other SIBs. In this case, steps 1507 to S1509 are performed for each of the other SIBs. Unified descriptions are provided herein, and details are not described below again.

It should be noted that, in these embodiments of this application, after completing the procedure for processing the SIB 1 or the procedure for processing the other SIB, the third device may further continue to perform the NPSS procedure, the NSSS procedure, or the MIB procedure. Unified descriptions are provided herein, and details are not described below again.

Figure 16A:
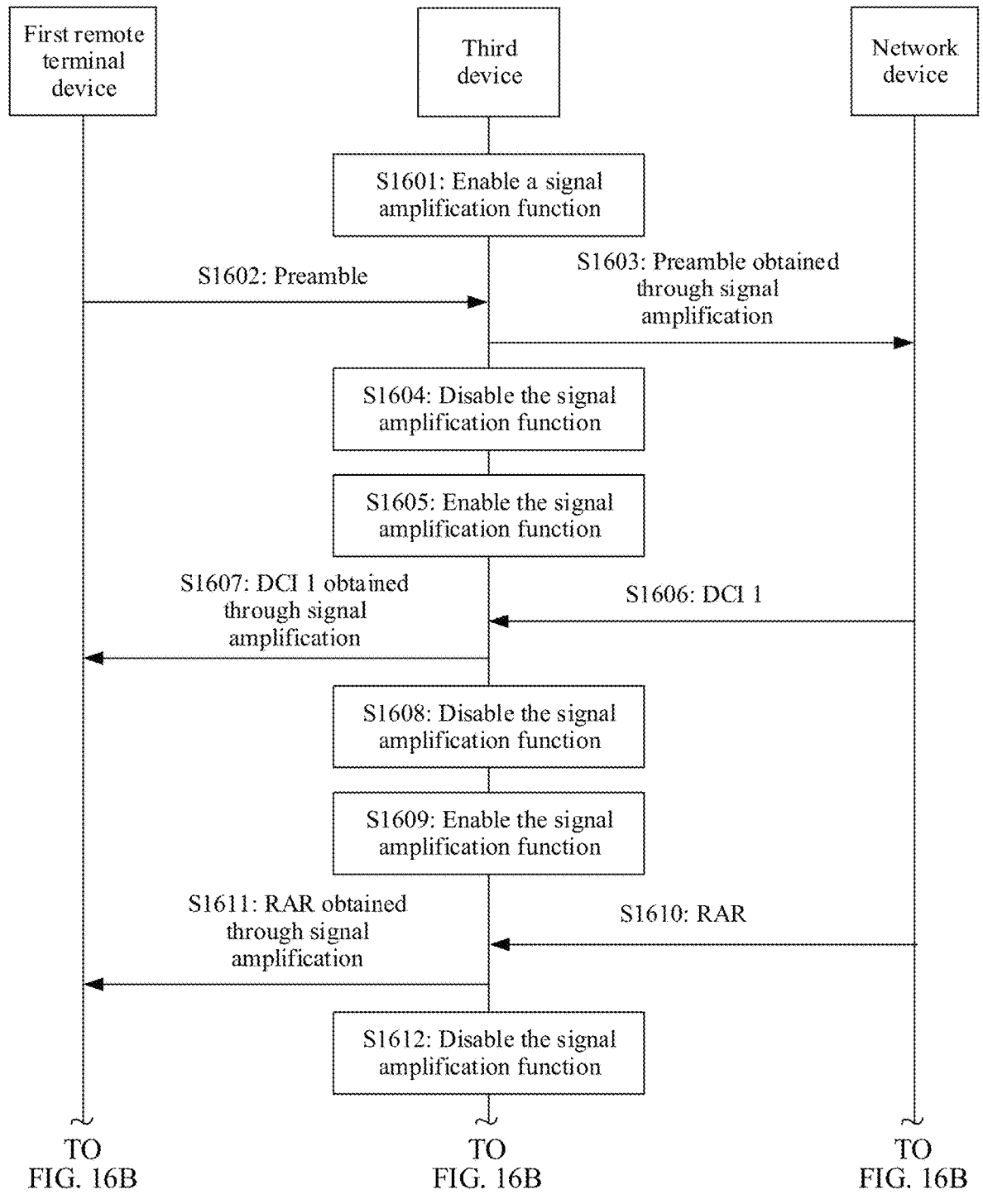
FIG. 16A and FIG. 16B are a schematic flowchart of still another signal processing method according to an embodiment of this application.
Figure 16B:
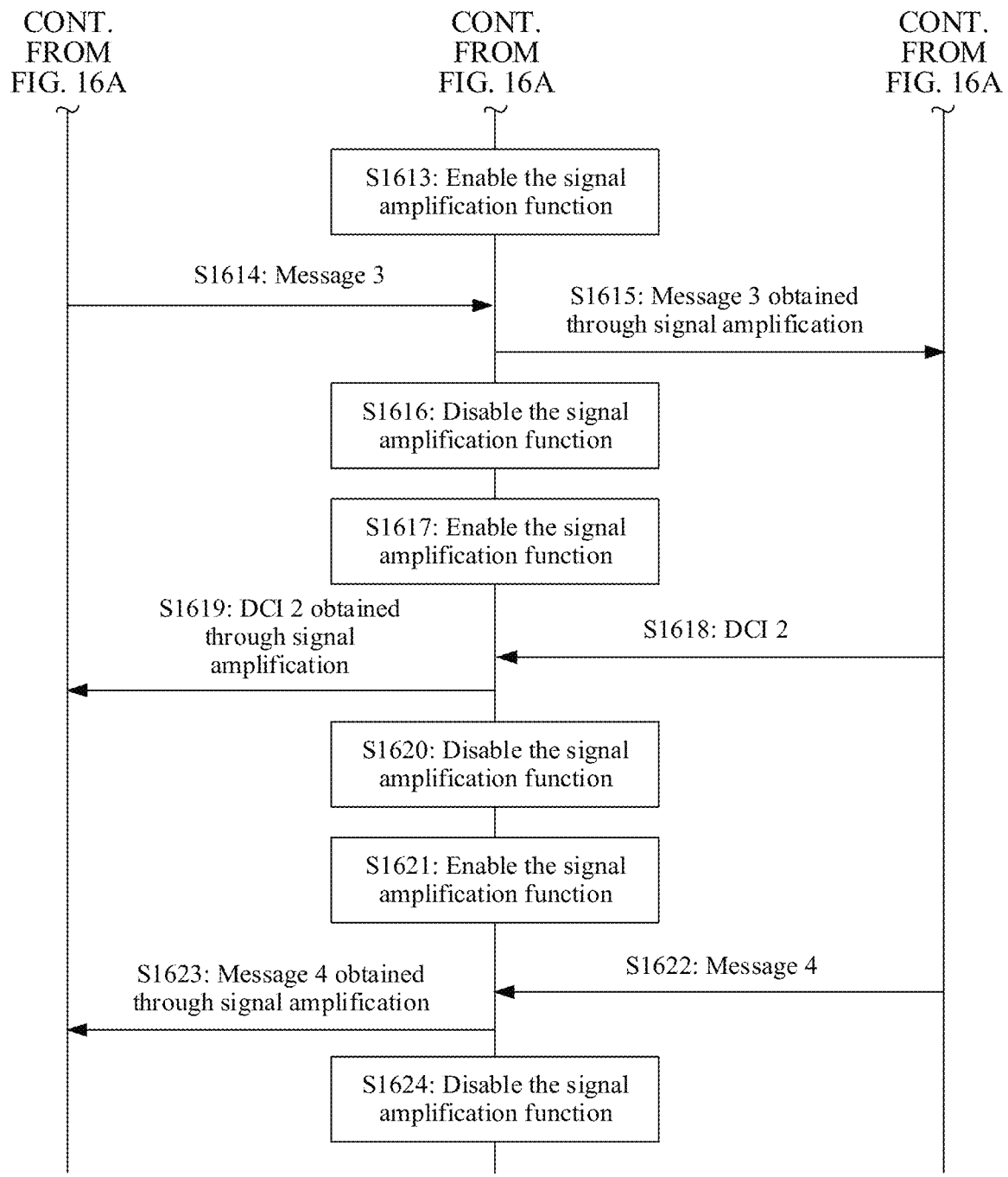

After the foregoing signal processing procedure ends, the terminal device may initiate a random access procedure. The following provides a signal processing method in the random access procedure. As shown in FIG. 16A and FIG. 16B, the method includes the following steps.

S1601: After receiving a first SIB, the third device enables, based on information that indicates a time domain position of an NPRACH resource and that is included in the first SIB, the signal amplification function at or before a start time domain position of the NPRACH resource.

Optionally, the first SIB herein may be, for example, a SIB 2, a SIB 22, or a SIB 23.

S1602: The first remote terminal device sends, to the third device, a preamble carried on the NPRACH resource. Correspondingly, the third device receives, from the first remote terminal device, the preamble carried on the NPRACH resource.

S1603: The third device amplifies the preamble at the position of the NPRACH resource, and sends the preamble obtained through signal amplification to the network device. Correspondingly, the network device receives the amplified preamble from the third device.

Optionally, in these embodiments of this application, the third device may further parse the preamble to obtain a first RA-RNTI. Unified descriptions are provided herein, and details are not described below again.

S1604: The third device disables the signal amplification function at or after an end time domain position of the NPRACH resource.

S1605: After detecting the preamble carried on the NPRACH resource, the third device enables, based on information that indicates a time domain position of an NPDCCH resource 1 and that is included in a second SIB, the signal amplification function at or before a start time domain position of the NPDCCH resource 1.

In these embodiments of this application, the information that indicates the time domain position of the NPDCCH resource 1 may be information about a specific time window. A size of the specific time window is coverage-related, and is indicated by the second SIB. The size of the specific time window is a multiple of {2, 3, 4, 5, 6, 7, 8, 10} *NPDCCH search space periodicity, but cannot exceed 10.24 s.

Optionally, the second SIB herein may be, for example, the SIB 2, the SIB 22, or the SIB 23.

S1606: After receiving the preamble, the network device sends, to the third device in the specific time window, DCI 1 carried on the NPDCCH resource 1, where the DCI 1 is used to schedule a RAR (which may also be referred to as a message 2). Correspondingly, the third device receives, from the network device, the DCI 1 carried on the NPDCCH resource 1.

Optionally, in these embodiments of this application, the third device may alternatively descramble (which may also be referred to as parse), by using the first RA-RNTI on the NPDCCH resource 1 for scheduling the RAR in the specific time window, the DCI 1 for scheduling the RAR, to obtain scheduling information of the RAR, for example, a quantity of repetitions of the RAR. Unified descriptions are provided herein, and details are not described below again.

In addition, it should be noted that the first RA-RNTI in these embodiments of this application may also be referred to as a first radio network temporary identifier. In other words, the third device parses, by using the first radio network temporary identifier, the DCI 1 for scheduling the RAR. The first radio network temporary identifier is a radio network identifier used by the first remote terminal device to parse the DCI 1 for scheduling the RAR. In other words, the first remote terminal device descrambles, by using the first RA-RNTI, the DCI 1 for scheduling the RAR. Unified descriptions are provided herein, and details are not described below again.

S1607: The third device amplifies the DCI 1 at the position of the NPDCCH resource 1, and sends the DCI 1 obtained through signal amplification to the first remote terminal device. Correspondingly, the first remote terminal device receives the amplified DCI 1 from the third device.

S1608: The third device disables the signal amplification function at or after an end time domain position of the NPDCCH resource 1.

S1609: The third device enables, based on the obtained scheduling information of the RAR, the signal amplification function at or before a start position of a position of a time domain resource for transmitting the RAR.

S1610: The network device sends the RAR to the third device. Correspondingly, the third device receives the RAR from the network device.

S1611: The third device amplifies the RAR at the position of the time domain resource for transmitting the RAR, and sends the RAR obtained through signal amplification to the first remote terminal device. Correspondingly, the first remote terminal device receives the amplified RAR from the third device.

Optionally, in these embodiments of this application, the third device may alternatively parse the RAR to obtain a first TC-RNTI and scheduling information of a message 3 that are allocated by the network device to the first remote terminal device. Unified descriptions are provided herein, and details are not described below again.

S1612: The third device disables the signal amplification function at or after an end position of the position of the time domain resource for transmitting the RAR.

S1613: The third device enables, based on the obtained scheduling information of the message 3, the signal amplification function at or before a start position of a position of a time domain resource for transmitting the message 3.

S1614: The first remote terminal device sends the message 3 to the third device. Correspondingly, the third device receives the message 3 from the first remote terminal device.

In these embodiments of this application, the message 3 carries information such as a terminal identifier of the first remote terminal device and a reason for triggering sending of the message 3.

S1615: The third device amplifies the message 3 at the position of the time domain resource for transmitting the message 3, and sends the message 3 obtained through signal amplification to the network device. Correspondingly, the network device receives the amplified message 3 from the third device.

S1616: The third device disables the signal amplification function at or after an end position of the position of the time domain resource for transmitting the message 3.

S1617: The third device enables, based on information that indicates a time domain position of an NPDCCH resource 2 and that is included in a third SIB, the signal amplification function at or before a start time domain position of the NPDCCH resource 2. Optionally, the third SIB herein may be, for example, the SIB 2, an SIB 20, or the SIB 22.

It should be noted that, in these embodiments of this application, the information that indicates the time domain position of the NPDCCH resource 2 may be the same as the information that indicates the time domain position of the NPDCCH resource 1. This is not specifically limited to the embodiments of this application.

S1618: After receiving the message 3, the network device sends, to the third device, DCI 2 carried on the NPDCCH resource 2, where the DCI 2 is used to schedule a message 4. Correspondingly, the third device receives, from the network device, the DCI 2 carried on the NPDCCH resource 2.

Optionally, in these embodiments of this application, the third device may alternatively descramble, on the NPDCCH resource 2 by using the first TC-RNTI, the DCI 2 for scheduling the message 4, to obtain scheduling information of the message 4, for example, a quantity of repetitions of the message 4. Unified descriptions are provided herein, and details are not described below again.

In addition, it should be noted that the first TC-RNTI in these embodiments of this application may also be referred to as the first radio network temporary identifier. In other words, the third device parses, by using the first radio network temporary identifier, the DCI 2 for scheduling the message 4. The first radio network temporary identifier is a radio network identifier used by the first remote terminal device to parse the DCI 2 for scheduling the message 4. In other words, the first remote terminal device descrambles, by using the first TC-RNTI, the DCI 2 for scheduling the message 4. Unified descriptions are provided herein, and details are not described below again.

S1619: The third device amplifies the DCI 2 at the position of the NPDCCH resource 2, and sends the DCI 2 obtained through signal amplification to the first remote terminal device. Correspondingly, the first remote terminal device receives the amplified DCI 2 from the third device.

S1620: The third device disables the signal amplification function at or after an end time domain position of the NPDCCH resource 2.

S1621: The third device enables, based on the obtained scheduling information of the message 4, the signal amplification function at or before a start position of a position of a time domain resource for transmitting the message 4.

S1622: The network device sends the message 4 to the third device. Correspondingly, the third device receives the message 4 from the network device.

S1623: The third device amplifies the message 4 at the position of the time domain resource for transmitting the message 4, and sends the message 4 obtained through signal amplification to the first remote terminal device. Correspondingly, the first remote terminal device receives the amplified message 4 from the third device.

Optionally, in these embodiments of this application, the third device may alternatively descramble, by using the first TC-RNTI, an NPDSCH carrying the message 4 and parse the message 4 to obtain a first C-RNTI of the first remote terminal device, so that the first TC-RNTI can be subsequently upgraded to the first C-RNTI. Unified descriptions are provided herein, and details are not described below again.

In addition, it should be noted that the first TC-RNTI in these embodiments of this application may also be referred to as the first radio network temporary identifier. In other words, the third device parses, by using the first radio network temporary identifier, the NPDSCH carrying the message 4. The first radio network temporary identifier is a radio network identifier used by the first remote terminal device to parse the NPDSCH carrying the message 4. In other words, the first remote terminal device descrambles, by using the first TC-RNTI, the NPDSCH carrying the message 4. Unified descriptions are provided herein, and details are not described below again.

S1624: The third device disables the signal amplification function at or after an end position of the position of the time domain resource for transmitting the message 4.

It should be noted that the RAR or the message 4 in these embodiments of this application may be understood as downlink data carried on the NPDSCH. The message 3 in these embodiments of this application may be understood as uplink data carried on an NPUSCH. Unified descriptions are provided herein, and details are not described below again.

In this case, the random access process provided in these embodiments of this application ends.

After the foregoing random access procedure ends, uplink or downlink data may be scheduled. The following provides a signal processing method in an uplink or downlink data scheduling procedure. The signal processing method in the uplink data scheduling procedure shown in part (a) in FIG. 17 includes the following steps.

S1701a: The third device learns of, based on configuration information that is of a first USS and that is carried in the message 4 in the random access procedure, information that indicates a time domain position of an NPDCCH resource 3 that carries DCI 3 for scheduling a message 5, and then enables the signal amplification function at or before a start time domain position of the NPDCCH resource 3.

S1702a: The network device sends, to the third device, the DCI 3 carried on the NPDCCH resource 3, where the DCI 3 is used to schedule the message 5. Correspondingly, the third device receives, from the network device, the DCI 3 carried on the NPDCCH resource 3.

Optionally, in these embodiments of this application, the third device may alternatively descramble, on the NPDCCH resource 3 by using the first C-RNTI, the DCI 3 for scheduling the message 5, to obtain scheduling information of the message 5, for example, a quantity of repetitions of the message 5. Unified descriptions are provided herein, and details are not described below again.

In addition, it should be noted that the first C-RNTI in these embodiments of this application may also be referred to as the first radio network temporary identifier. In other words, the third device parses, by using the first radio network temporary identifier, the DCI 3 for scheduling the message 5. The first radio network temporary identifier is a radio network identifier used by the first remote terminal device to parse the DCI 3 for scheduling the message 5. In other words, the first remote terminal device descrambles, by using the first C-RNTI, the DCI 3 for scheduling the message 5. Unified descriptions are provided herein, and details are not described below again.

S1703a: The third device amplifies the DCI 3 at the position of the NPDCCH resource 3, and sends the DCI 3 obtained through signal amplification to the first remote terminal device. Correspondingly, the first remote terminal device receives the amplified DCI 3 from the third device.

S1704a: The third device disables the signal amplification function at or after an end time domain position of the NPDCCH resource 3.

S1705a: The third device enables, based on the obtained scheduling information of the message 5, the signal amplification function at or before a start position of a position of a time domain resource for transmitting the message 5.

S1706a: The first remote terminal device sends the message 5 to the third device. Correspondingly, the third device receives the message 5 from the first remote terminal device.

S1707a: The third device amplifies the message 5 at the position of the time domain resource for transmitting the message 5, and sends the message 5 obtained through signal amplification to the network device. Correspondingly, the network device receives the amplified message 5 from the third device.

S1708a: The third device disables the signal amplification function at or after an end position of the position of the time domain resource for transmitting the message 5.

It should be noted that the message 5 in these embodiments of this application may also be understood as uplink data carried on the NPUSCH. Unified descriptions are provided herein, and details are not described below again.

In this case, the uplink data scheduling procedure ends.

Figure 17:
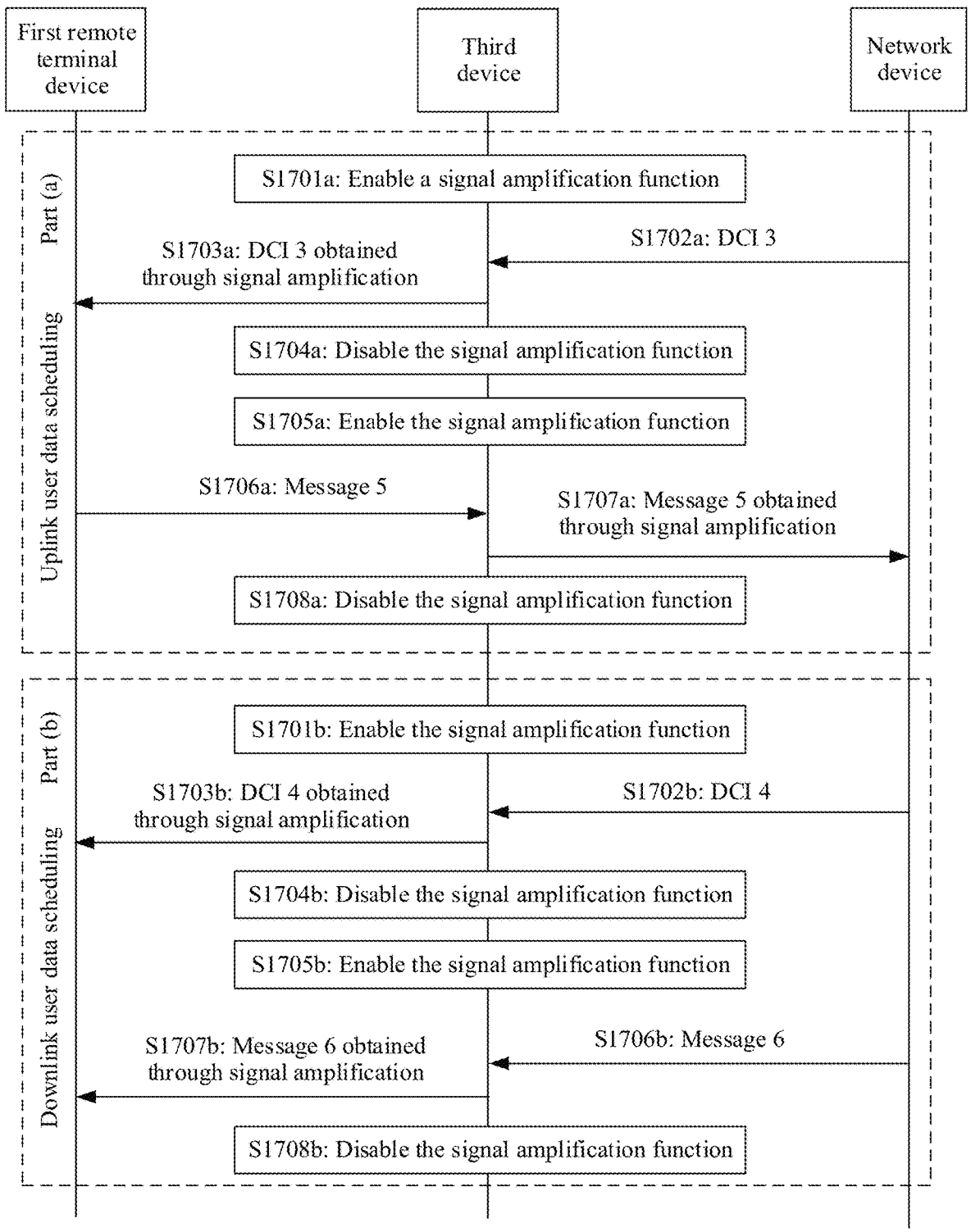
FIG. 17 is a schematic flowchart of still another signal processing method according to an embodiment of this application.

The signal processing method in the downlink data scheduling procedure shown in part (b) in FIG. 17 includes the following steps.

S1701b: The third device learns of, based on configuration information that is of a first USS and that is carried in the message 4, information that indicates a time domain position of an NPDCCH resource 4 that carries DCI 4 for scheduling a message 6, and then enables the signal amplification function at or before a start time domain position of the NPDCCH resource 4.

S1702b: The network device sends, to the third device, the DCI 4 carried on the NPDCCH resource 4, where the DCI 4 is used to schedule the message 6. Correspondingly, the third device receives, from the network device, the DCI 4 carried on the NPDCCH resource 4.

Optionally, in these embodiments of this application, the third device may alternatively descramble, on the NPDCCH resource 4 by using the first C-RNTI, the DCI 4 for scheduling the message 6, to obtain scheduling information of the message 6, for example, a quantity of repetitions of the message 6. Unified descriptions are provided herein, and details are not described below again.

In addition, it should be noted that the first C-RNTI in these embodiments of this application may also be referred to as the first radio network temporary identifier. In other words, the third device parses, by using the first radio network temporary identifier, the DCI 4 for scheduling the message 6. The first radio network temporary identifier is a radio network identifier used by the first remote terminal device to parse the DCI 4 for scheduling the message 6. In other words, the first remote terminal device descrambles, by using the first C-RNTI, the DCI 4 for scheduling the message 6. Unified descriptions are provided herein, and details are not described below again.

S1703b: The third device amplifies the DCI 4 at the position of the NPDCCH resource 4, and sends the DCI 4 obtained through signal amplification to the first remote terminal device. Correspondingly, the first remote terminal device receives the amplified DCI 4 from the third device.

S1704b: The third device disables the signal amplification function at or after an end time domain position of the NPDCCH resource 4.

S1705b: The third device enables, based on the obtained scheduling information of the message 6, the signal amplification function at or before a start position of a position of a time domain resource for transmitting the message 6.

S1706b: The network device sends the message 6 to the third device. Correspondingly, the third device receives the message 6 from the network device.

S1707b: The third device amplifies the message 6 at the position of the time domain resource for transmitting the message 6, and sends the message 6 obtained through signal amplification to the first remote terminal device. Correspondingly, the first remote terminal device receives the amplified message 6 from the third device.

S1708b: The third device disables the signal amplification function at or after an end position of the position of the time domain resource for transmitting the message 6.

It should be noted that the message 6 in these embodiments of this application may also be understood as downlink data carried on the NPDSCH. Unified descriptions are provided herein, and details are not described below again.

In this case, the downlink data scheduling procedure ends.

Optionally, in these embodiments of this application, the random access process, the downlink data processing process, and the uplink data processing process that are described above are all described for the network device and one remote terminal device. Actually, the network device may interact with a plurality of remote terminal devices. In this case, the third device may prestore a mapping relationship between a radio network temporary identifier and a USS or a CSS, and the mapping relationship includes a mapping relationship between the first radio network temporary identifier and the first USS or a first CSS. The first radio network temporary identifier herein may be the first C-RNTI, the first RA-RNTI, or the first TC-RNTI. For a manner in which the third device determines the first radio network temporary identifier, refer to the manner in which the first device determines the first radio network temporary identifier in the foregoing embodiments. Details are not described herein again.

Optionally, in these embodiments of this application, for a manner of obtaining the mapping relationship that is between the first radio network temporary identifier and the first USS or the first CSS and that is prestored by the third device, refer to the manner of obtaining the mapping relationship that is between the first radio network temporary identifier and the first USS or the first CSS and that is prestored by the first device in the foregoing embodiments. Details are not described herein again.

Figure 18:
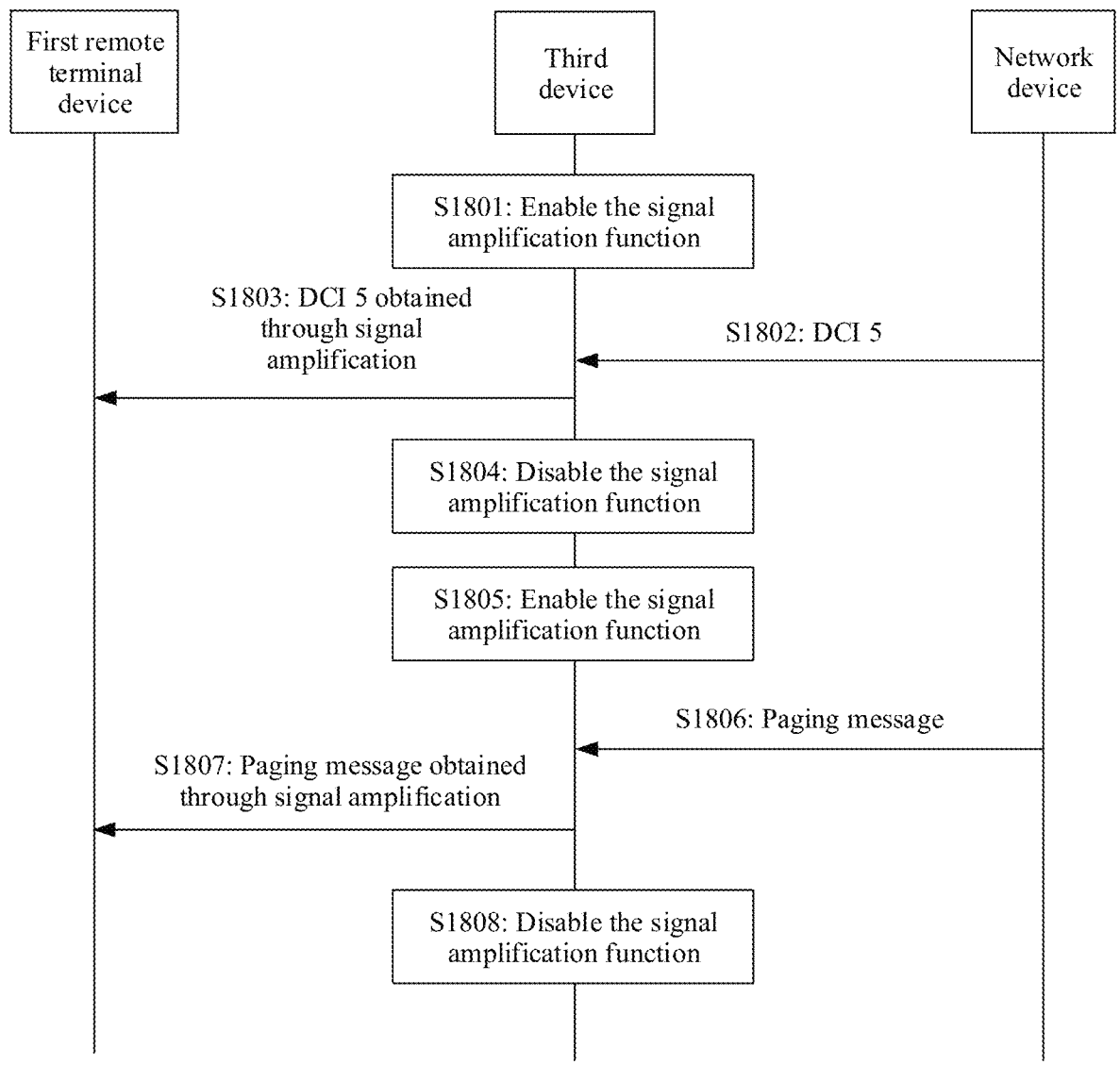
FIG. 18 is a schematic flowchart of still another signal processing method according to an embodiment of this application.

Optionally, in these embodiments of this application, when the first remote terminal device is in an idle mode, the first remote terminal device may detect, in a blind detection manner, a physical downlink control channel in a physical downlink control channel search space in which a position of a PO is a start subframe. This process is referred to as a paging procedure. After paging succeeds, the foregoing random access procedure can be entered. The following provides a signal processing method in the paging procedure. As shown in FIG. 18, the method includes the following steps.

S1801: The third device enables, based on information that indicates a time domain position of an NPDCCH resource 5 and that is included in a fourth SIB, the signal amplification function at or before a start time domain position of the NPDCCH resource 5.

In these embodiments of this application, the information that indicates the time domain position of the NPDCCH resource 5 may be a size of a DRX cycle, a paging density (to be specific, a quantity of paging opportunities included in one DRX cycle), and a quantity of repetitions of the NPDCCH scrambled by using a P-RNTI. A position of a PO may be determined based on the paging density and the DRX cycle, and the position of the PO is a start position of the NPDCCH resource 5. Optionally, the fourth SIB herein may be, for example, the SIB 2.

S1802: The network device sends, to the third device, DCI 5 carried on the NPDCCH resource 5, where the DCI 5 is used to schedule a paging message. Correspondingly, the third device receives, from the network device, the DCI 5 carried on the NPDCCH resource 5.

Optionally, in these embodiments of this application, the third device may alternatively descramble, on the NPDCCH resource 5 by using the P-RNTI, the DCI 5 for scheduling the paging message, to obtain scheduling information of the paging message, for example, a quantity of repetitions of the paging message. Unified descriptions are provided herein, and details are not described below again.

In addition, it should be noted that a first P-RNTI in these embodiments of this application may also be referred to as the first radio network temporary identifier. In other words, the third device parses, by using the first radio network temporary identifier, the DCI 5 for scheduling the paging message. The first radio network temporary identifier is a radio network identifier used by the first remote terminal device to parse the DCI 5 for scheduling the paging message. In other words, the first remote terminal device descrambles, by using the first P-RNTI, the DCI 5 for scheduling the paging message. Unified descriptions are provided herein, and details are not described below again.

S1803: The third device amplifies the DCI 5 at the position of the NPDCCH resource 5, and sends the DCI 5 obtained through signal amplification to the first remote terminal device. Correspondingly, the first remote terminal device receives the amplified DCI 5 from the third device.

S1804: The third device disables the signal amplification function at or after an end time domain position of the NPDCCH resource 5.

S1805: The third device enables, based on the obtained scheduling information of the paging message, the signal amplification function at or before a start position of a position of a time domain resource for transmitting the paging message.

S1806: The network device sends the paging message to the third device. Correspondingly, the third device receives the paging message from the network device.

S1807: The third device amplifies the paging message at the position of the time domain resource for transmitting the paging message, and sends the paging message obtained through signal amplification to the first remote terminal device. Correspondingly, the first remote terminal device receives the amplified paging message from the third device.

S1808: The third device disables the signal amplification function at or after an end position of the position of the time domain resource for transmitting the paging message.

It should be noted that, when the network device does not need to page the remote terminal device, the network device does not send the DCI 5 at the position of the NPDCCH resource 5. In this case, the third device still needs to amplify a resource in which the NPDCCH resource 5 is located. That is, the procedure of S1801 to S1808 includes only S1801 and S1804. Unified descriptions are provided herein, and details are not described below again.

Optionally, in the embodiments of this application, if time domain resource positions of a plurality of signals overlap (including partial overlap or all overlap), the third device needs to enable the signal amplification function at or before a start position of a position of a time-frequency resource for transmitting the $1^{st}$ signal, and disables the signal amplification function at or before an end position of a position of a time-frequency resource for transmitting the last signal. The $1^{st}$ signal herein is a signal whose start position of the time domain resource position is the foremost, and the last signal herein is a signal whose end position of the time domain resource position is the rearmost. For example, as shown in FIG. 14, it is assumed that a start moment of a time domain resource position corresponding to a signal a is a moment 1, and an end moment of the time domain resource position corresponding to the signal a is a moment 4; a start moment of a time domain resource position corresponding to a signal b is a moment 2, and an end moment of the time domain resource position corresponding to the signal b is a moment 7; a start moment of a time domain resource position corresponding to a signal c is a moment 3, and an end moment of the time domain resource position corresponding to the signal c is a moment 5; a start moment of a time domain resource position corresponding to a signal d is a moment 6, and an end moment of the time domain resource position corresponding to the signal d is a moment 8; and a start moment of a time domain resource position corresponding to a signal e is a moment 9, and an end moment of the time domain resource position corresponding to the signal e is a moment 10. The moments are sorted as follows: the moment 1≤ the moment 2≤ the moment 3≤ the moment 4≤ the moment 5≤ the moment 6≤ the moment 7< the moment 8≤ the moment 9≤ the moment 10. The third device needs to enable the signal amplification function at or before a start position of a time-frequency resource position for transmitting the signal a (that is, enable the signal amplification function at or before the moment 1), and disable the signal amplification function at or before an end position of a time-frequency resource position for transmitting the signal d (that is, disable the signal amplification function at or after the moment 8). Unified descriptions are provided herein, and details are not described below again.

To implement the foregoing functions, in a possible implementation, after determining time domain resource positions for transmitting signals, the third device maintains a relationship list shown in Table 3. The relationship list includes a mapping relationship among a signal, a corresponding signal amplification function enabling moment, and a corresponding signal amplification function disabling moment. Therefore, the third device may learn, based on the mapping relationship, whether the time domain positions for transmitting the different signals overlap, and if the time domain positions for transmitting the different signals overlap, learn of a signal amplification function enabling moment corresponding to the 1$^{st}$ signal and a signal amplification function disabling moment corresponding to the last signal.

TABLE 3

| Enabling moment | Disabling moment | Signal |
|---|---|---|
| Moment 1 | Moment 4 | Signal a |
| Moment 2 | Moment 7 | Signal b |
| Moment 3 | Moment 5 | Signal c |
| Moment 6 | Moment 8 | Signal d |
| Moment 9 | Moment 10 | Signal e |
| ... | ... | ... |

Optionally, the third device in the embodiment of this application is in a persistent connection mode, that is, is generally in a connected mode, after being powered on and accessing a network. When system information changes in the network device, the network device directly indicates an RRC message to notify the third device that the system information changes. The RRC message may be a new RRC message. After receiving the RRC message, the third device learns that the system information changes, so that the third device may further re-determine resource positions of paging, random access, reference signals, and the like. Unified descriptions are provided herein, and details are not described below again.

Optionally, in the embodiments of this application, the third device may notify the network device of a C-RNTI of the third device by using an RRC message. The RRC message carries the C-RNTI of the third device. When knowing the C-RNTI of the third device, the network device may communicate with the third device, for example, indicates, by using an RRC message, to the third device that system information changes. Unified descriptions are provided herein, and details are not described below again.

It should be noted that the procedure for processing the NPSS, the procedure for processing the NSS, the procedure for processing the MIB, the procedure for processing the SIB 1, the procedure for processing the other SIB, the random access procedure, the uplink or downlink data scheduling procedure, and the paging procedure in the foregoing embodiments of this application are decoupled from each other and independent of each other. For example, the paging procedure before the random access procedure may alternatively be another paging procedure, or the random access procedure after the paging procedure may alternatively be another random access procedure. This is not specifically limited in the embodiments of this application.

Generally, as a repeater is generally enabled, the repeater amplifies both wanted signals and noise. When a DeNB does not send data to a remote terminal device, amplified noise causes noise interference to the DeNB and another terminal device. According to the signal processing method shown in FIG. 15, FIG. 16A, FIG. 16B, FIG. 17, or FIG. 18 in the embodiments of this application, the third device can determine the first time domain resource position for transmitting the first signal, and enable the signal amplification function of the third device at or before the start position of the first time domain resource position. To be specific, signal amplification is performed only when a signal needs to be forwarded, and the signal amplification function does not need to be enabled when no signal needs to be forwarded. This can avoid the problem that amplified noise causes noise interference to the DeNB and the other terminal device when the DeNB does not send data to the remote terminal device, and therefore reduce noise interference.

The actions of the third device in the steps in FIG. 15 to FIG. 18 may be performed by the processor 601 in the communication device 600 shown in FIG. 6 by invoking the application program code stored in the memory 603. This is not limited in the embodiments of this application.

It may be understood that, in the foregoing embodiments, the methods and/or steps implemented by the first device may alternatively be implemented by a chip system that implements functions of the first device, and the methods and/or steps implemented by the third device may alternatively be implemented by a chip system that implements functions of the third device.

The foregoing mainly describes the solutions provided in the embodiments of this application from a perspective of interaction between the network elements. Correspondingly, embodiments of this application further provides a communication apparatus. The communication apparatus is configured to implement the foregoing methods. The communication apparatus may be the first device in the foregoing method embodiments or a chip system that implements a function of the first device. Alternatively, the communication apparatus may be the third device in the foregoing method embodiments or a chip system that implements a function of the third device. It may be understood that, to implement the foregoing functions, the communication apparatus includes corresponding hardware structures and/or software modules for performing the functions. A person skilled in the art should be easily aware that, with reference to units and algorithm steps in the examples described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In an actual implementation, another division manner may be used.

Figure 19:
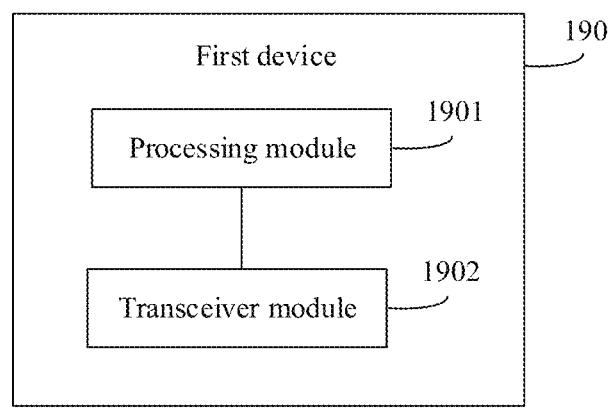
FIG. 19 is a schematic diagram of a structure of a first device according to an embodiment of this application.

For example, the communication apparatus is the first device in the foregoing method embodiments. FIG. 19 is a schematic diagram of a structure of a first device 190. The first device 190 includes a processing module 1901 and a transceiver module 1902. The transceiver module 1902 may also be referred to as a transceiver unit, and is configured to implement a sending function and/or a receiving function. For example, the transceiver module 1902 may be a transceiver circuit, a transceiver machine, a transceiver, or a communication interface.

The processing module 1901 is configured to: determine a first time domain resource position for transmitting a first signal. The transceiver module 1902 is configured to send first control signaling to a second device at or before a start position of the first time domain resource position, where the first control signaling is used to enable a signal amplification function of the second device.

Optionally, the processing module 1901 is configured to: receive a second signal from a network device through the transceiver module 1902, where the second signal includes information used to indicate the first time domain resource position; and determine the first time domain resource position based on the second signal.

Optionally, that the processing module 1901 is configured to determine the first time domain resource position based on the second signal includes: The processing module 1901 is configured to parse the second signal by using a first radio network temporary identifier, to obtain the first time domain resource position, where the first radio network temporary identifier is a radio network identifier used by a first remote terminal device to parse the second signal, and the first remote terminal device is a terminal device that receives the second signal.

Optionally, the processing module 1901 is further configured to determine a first common search space or a first terminal-specific search space corresponding to a second time domain resource position for transmitting the second signal. The processing module 1901 is further configured to determine the first radio network temporary identifier based on the first common search space or the first terminal-specific search space and a prestored mapping relationship between the first radio network temporary identifier and the first common search space or the first terminal-specific search space.

Optionally, the processing module 1901 is further configured to parse a preamble carried on a physical random access channel to obtain the first radio network temporary identifier. Alternatively, the processing module 1901 is further configured to parse third downlink data carried on a third physical downlink shared channel to obtain the first radio network temporary identifier.

Optionally, the transceiver module 1902 is further configured to send second control signaling to the second device at or after an end position of the first time domain position, where the second control signaling is used to disable the signal amplification function.

All related content of the steps in the foregoing method embodiments may be cited in function descriptions of the corresponding functional modules. Details are not described herein again.

In these embodiments, the first device 190 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the first device 190 may be in a form of the communication device 600 shown in FIG. 6.

For example, the processor 601 in the communication device 600 shown in FIG. 6 may invoke the computer-executable instructions stored in the memory 603, to enable the communication device 600 to perform the signal processing method in the foregoing method embodiments.

Specifically, functions/implementation processes of the transceiver module 1902 and the processing module 1901 in FIG. 19 may be implemented by the processor 601 in the communication device 600 shown in FIG. 6 by invoking the computer-executable instructions stored in the memory 603. Alternatively, a function/an implementation process of the processing module 1901 in FIG. 19 may be implemented by the processor 601 in the communication device 600 shown in FIG. 6 by invoking the computer-executable instructions stored in the memory 603, and a function/an implementation process of the transceiver module 1902 in FIG. 19 may be implemented by the communication interface 604 in the communication device 600 shown in FIG. 6.

The first device 190 provided in these embodiments can perform the foregoing signal processing method. Therefore, for a technical effect that can be achieved by the first device 190, refer to the foregoing method embodiments. Details are not described herein again.

Figure 20:
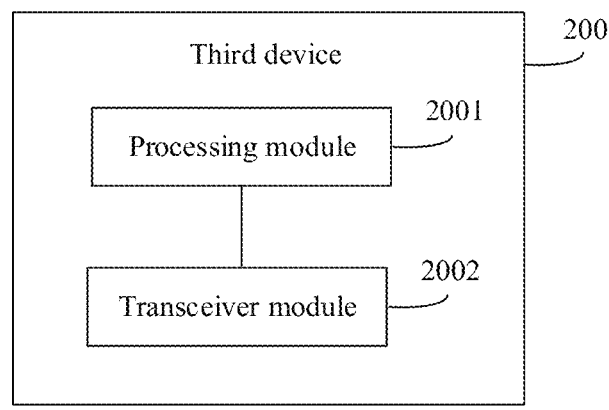
FIG. 20 is a schematic diagram of a structure of a third device according to an embodiment of this application.

Alternatively, for example, the communication apparatus is the third device in the foregoing method embodiments. FIG. 20 is a schematic diagram of a structure of a third device 200. The third device 200 includes a processing module 2001, and optionally includes a transceiver module 2002. The transceiver module 2002 may also be referred to as a transceiver unit, and is configured to implement a sending function and/or a receiving function. For example, the transceiver module 2002 may be a transceiver circuit, a transceiver machine, a transceiver, or a communication interface.

The processing module 2001 is configured to determine a first time domain resource position for transmitting a first signal. The processing module 2001 is further configured to enable a signal amplification function of the third device at or before a start position of the first time domain resource position.

Optionally, the processing module 2001 is configured to: receive a second signal from a network device through the transceiver module 2002, where the second signal includes information used to indicate the first time domain resource position; and determine the first time domain resource position based on the second signal.

Optionally, that the processing module 2001 is configured to determine the first time domain resource position based on the second signal includes: The processing module 2001 is configured to parse the second signal by using a first radio network temporary identifier, to obtain the first time domain resource position, where the first radio network temporary identifier is a radio network identifier used by a first remote terminal device to parse the second signal, and the first remote terminal device is a terminal device that receives the second signal.

Optionally, the processing module 2001 is further configured to determine a first common search space or a first terminal-specific search space corresponding to a second time domain resource position for transmitting the second signal. The processing module 2001 is further configured to determine the first radio network temporary identifier based on the first common search space or the first terminal-specific search space and a prestored mapping relationship between the first radio network temporary identifier and the first common search space or the first terminal-specific search space.

Optionally, the processing module 2001 is further configured to parse a preamble carried on a physical random access channel to obtain the first radio network temporary identifier. Alternatively, the processing module 2001 is further configured to parse third downlink data carried on a third physical downlink shared channel to obtain the first radio network temporary identifier.

Optionally, the processing module 2001 is further configured to disable the signal amplification function at or after an end position of the first time domain position.

All related content of the steps in the foregoing method embodiments may be cited in function descriptions of the corresponding functional modules. Details are not described herein again.

In these embodiments, the third device 200 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the third device 200 may be in a form of the communication device 600 shown in FIG. 6.

For example, the processor 601 in the communication device 600 shown in FIG. 6 may invoke the computer-executable instructions stored in the memory 603, to enable the communication device 600 to perform the signal processing method in the foregoing method embodiments.

Specifically, functions/implementation processes of the transceiver module 2002 and the processing module 2001 in FIG. 20 may be implemented by the processor 601 in the communication device 600 shown in FIG. 6 by invoking the computer-executable instructions stored in the memory 603. Alternatively, a function/an implementation process of the processing module 2001 in FIG. 20 may be implemented by the processor 601 in the communication device 600 shown in FIG. 6 by invoking the computer-executable instructions stored in the memory 603, and a function/an implementation process of the transceiver module 2002 in FIG. 20 may be implemented by the communication interface 604 in the communication device 600 shown in FIG. 6.

The third device 200 provided in these embodiments can perform the foregoing signal processing method. Therefore, for a technical effect that can be achieved by the third device 200, refer to the foregoing method embodiments. Details are not described herein again.

Optionally, embodiments of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store program instructions and data. The processor may invoke program code stored in the memory, to instruct the communication apparatus to perform the method in any one of the foregoing method embodiments. Certainly, the memory may not be located in the communication apparatus. When the communication apparatus is a chip system, the communication apparatus may include a chip, or may include a chip and another discrete component. This is not specifically limited in these embodiments of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatuses.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, the specification and accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the scope of this application. This application is intended to cover the modifications and variations of this application provided that they fall within the scope of the claims of this application and their equivalent technologies.

What is claimed is:

1. A signal processing method, wherein the method comprises:
   determining, by a first device, a first time domain resource position for transmitting a first signal; and
   sending, by the first device, first control signaling to a second device at or before a start position of the first time domain resource position, wherein the first control signaling is used to enable a signal amplification function of the second device;
   wherein the determining, by the first device, the first time domain resource position for transmitting the first signal comprises:
   receiving, by the first device, a second signal from a network device, wherein the second signal comprises information indicating the first time domain resource position; and
   parsing, by the first device, the second signal by using a first radio network temporary identifier, to obtain the first time domain resource position, wherein the first radio network temporary identifier is a radio network identifier used by a first remote terminal device to parse the second signal, and the first remote terminal device is a terminal device that receives the second signal.

2. The method according to claim 1, wherein:
the second signal is a first downlink control message carried on a first physical downlink control channel, and the first signal is first downlink data carried on a first physical downlink shared channel;
the second signal is a second downlink control message carried on a second physical downlink control channel, and the first signal is first uplink data carried on a first physical uplink shared channel;
the second signal is a random access response (RAR), and the first signal is a message in a random access process; or
the second signal is second downlink data carried on a second physical downlink shared channel, and the first signal is a third downlink control message carried on a third physical downlink control channel.

3. The method according to claim 1, wherein the method further comprises:
determining, by the first device, a first common search space or a first terminal-specific search space corresponding to a second time domain resource position for transmitting the second signal; and
determining, by the first device, the first radio network temporary identifier based on the first common search space or the first terminal-specific search space and a prestored mapping relationship between the first radio network temporary identifier and the first common search space or the first terminal-specific search space.

4. A signal processing method, wherein the method comprises:
determining, by a third device, a first time domain resource position for transmitting a first signal; and
enabling, by the third device, a signal amplification function of the third device at or before a start position of the first time domain resource position;
wherein the determining, by the third device, the first time domain resource position for transmitting the first signal comprises:
receiving, by the third device, a second signal from a network device, wherein the second signal comprises information indicating the first time domain resource position; and
parsing, by the third device, the second signal by using a first radio network temporary identifier, to obtain the first time domain resource position, wherein the first radio network temporary identifier is a radio network identifier used by a first remote terminal device to parse the second signal, and the first remote terminal device is a terminal device that receives the second signal.

5. The method according to claim 4, wherein the second signal is a first downlink control message carried on a first physical downlink control channel, and the first signal is first downlink data carried on a first physical downlink shared channel;
the second signal is a second downlink control message carried on a second physical downlink control channel, and the first signal is first uplink data carried on a first physical uplink shared channel;
the second signal is a random access response (RAR), and the first signal is a message in a random access process; or
the second signal is second downlink data carried on a second physical downlink shared channel, and the first signal is a third downlink control message carried on a third physical downlink control channel.

6. The method according to claim 4, wherein the method further comprises:
determining, by the third device, a first common search space or a first terminal-specific search space corresponding to a second time domain resource position for transmitting the second signal; and
determining, by the third device, the first radio network temporary identifier based on the first common search space or the first terminal-specific search space and a prestored mapping relationship between the first radio network temporary identifier and the first common search space or the first terminal-specific search space.

7. A device comprising:
a processor; and
a computer readable storage medium storing computer program for execution by the processor, the computer program including instructions to cause the device to:
determine a first time domain resource position for transmitting a first signal; and
send first control signaling to a second device at or before a start position of the first time domain resource position, wherein the first control signaling is used to enable a signal amplification function of the second device;
wherein the computer program comprises further instructions to cause the device to:
receive a second signal from a network device, wherein the second signal comprises information used to indicate the first time domain resource position; and
parse the second signal by using a first radio network temporary identifier, to obtain the first time domain resource position, wherein the first radio network temporary identifier is a radio network identifier used by a first remote terminal device to parse the second signal, and the first remote terminal device is a terminal device that receives the second signal.

8. The device according to claim 7, wherein
the second signal is a first downlink control message carried on a first physical downlink control channel, and the first signal is first downlink data carried on a first physical downlink shared channel;
the second signal is a second downlink control message carried on a second physical downlink control channel, and the first signal is first uplink data carried on a first physical uplink shared channel;
the second signal is a random access response (RAR), and the first signal is a message in a random access process; or
the second signal is second downlink data carried on a second physical downlink shared channel, and the first signal is a third downlink control message carried on a third physical downlink control channel.

9. The device according to claim 7, wherein the computer program further comprises instructions to cause the device to:
determine a first common search space or a first terminal-specific search space corresponding to a second time domain resource position for transmitting the second signal; and
determine the first radio network temporary identifier based on the first common search space or the first terminal-specific search space and a prestored mapping relationship between the first radio network temporary identifier and the first common search space or the first terminal-specific search space.

10. A device comprising:
a processor; and
a computer readable storage medium storing computer program for execution by the processor, the computer program including instructions to cause the device to:
determine a first time domain resource position for transmitting a first signal; and
enable a signal amplification function of the device at or before a start position of the first time domain resource position;
wherein the computer program comprises further instructions to cause the device to:
receive a second signal from a network device, wherein the second signal comprises information used to indicate the first time domain resource position; and
parse the second signal by using a first radio network temporary identifier, to obtain the first time domain resource position, wherein the first radio network temporary identifier is a radio network identifier used by a first remote terminal device to parse the second signal, and the first remote terminal device is a terminal device that receives the second signal.

11. The device according to claim 10, wherein the second signal is a first downlink control message carried on a first physical downlink control channel, and the first signal is first downlink data carried on a first physical downlink shared channel;
the second signal is a second downlink control message carried on a second physical downlink control channel, and the first signal is first uplink data carried on a first physical uplink shared channel;
the second signal is a random access response (RAR), and the first signal is a message in a random access process; or
the second signal is second downlink data carried on a second physical downlink shared channel, and the first signal is a third downlink control message carried on a third physical downlink control channel.

12. The device according to claim 10, wherein the computer program further comprises instructions to cause the device to:
determine a first common search space or a first terminal-specific search space corresponding to a second time domain resource position for transmitting the second signal; and
determine the first radio network temporary identifier based on the first common search space or the first terminal-specific search space and a prestored mapping relationship between the first radio network temporary identifier and the first common search space or the first terminal-specific search space.

* * * * *